United States Patent [19]

McHugh

[11] Patent Number: 4,995,423
[45] Date of Patent: * Feb. 26, 1991

[54] VALVE AND ARRANGEMENT FOR FIRE SUPPRESSION WATER SPRINKLER SYSTEM

[75] Inventor: George J. McHugh, Broomall, Pa.

[73] Assignee: AGF Manufacturing, Inc., West Chester, Pa.

[ * ] Notice: The portion of the term of this patent subsequent to May 3, 2005 has been disclaimed.

[21] Appl. No.: 320,713

[22] Filed: Mar. 8, 1989

Related U.S. Application Data

[63] Continuation-in-part of Ser. No. 138,436, Dec. 28, 1987, Pat. No. 4,852,610, which is a continuation-in-part of Ser. No. 881,270, Jul. 2, 1986, Pat. No. 4,741,361, which is a continuation-in-part of Ser. No. 874,653, Jun. 16, 1986, abandoned.

[51] Int. Cl.⁵ .................................. F16K 37/00
[52] U.S. Cl. .................................. 137/559; 137/270; 251/206; 251/315; 73/168
[58] Field of Search .............. 137/557, 559, 270, 271; 251/206, 207, 208, 209, 315; 73/168

[56] References Cited

U.S. PATENT DOCUMENTS

| | | | |
|---|---|---|---|
| 350,510 | 10/1886 | Stretch | 73/332 |
| 421,224 | 2/1890 | Applegarth | 251/207 |
| 926,774 | 7/1909 | Schmidt | 174/102 R |
| 1,023,104 | 4/1912 | Carpenter | 251/207 |
| 1,056,344 | 3/1913 | Lester | 251/207 |
| 1,229,038 | 6/1917 | Cornelius | 251/207 |
| 1,264,775 | 4/1918 | Coles | 251/207 |
| 1,333,048 | 3/1920 | Webster | 251/207 |
| 1,428,744 | 9/1922 | Bastian et al. | |
| 1,666,918 | 5/1927 | Scoville | 184/96 |
| 1,757,237 | 5/1930 | Deutsch | 73/332 |
| 1,825,512 | 9/1931 | Durham et al. | 251/207 |
| 2,491,361 | 12/1949 | Burdick | |
| 2,621,012 | 12/1952 | Graham | 251/207 |
| 2,660,560 | 11/1953 | Pickard | 137/559 |
| 2,859,611 | 11/1958 | Morse | 73/168 |
| 3,016,062 | 1/1962 | Zinniger | |
| 3,021,869 | 2/1962 | Ross | |
| 3,052,445 | 9/1962 | Kessler | |
| 3,131,716 | 5/1964 | Griswold et al. | 137/559 |
| 3,134,405 | 5/1964 | White et al. | 251/207 |
| 3,139,907 | 7/1964 | Jones | |
| 3,148,695 | 9/1964 | Groen, Jr. et al. | |
| 3,233,865 | 2/1966 | Panzica et al. | |
| 3,251,419 | 5/1966 | Howard | |
| 3,273,595 | 9/1966 | Novak | 137/637.4 |
| 3,314,643 | 4/1967 | Sachnik | |
| 3,345,032 | 10/1967 | Rawstron | 251/315 |
| 3,347,516 | 10/1967 | Linde | |
| 3,385,318 | 5/1968 | Kilbourn | 137/557 |

(List continued on next page.)

FOREIGN PATENT DOCUMENTS 963446 2/1975 Canada .
110371 6/1925 Switzerland .
42304 8/1980 Switzerland .

OTHER PUBLICATIONS

Brochure from Victaulic dated Jun. 1986.
Brochure from Sunbelt Marketing, Inc. dated Apr. 15, 1986.
Brochure from Triple "R" Specialty Co. dated Nov. 1986.
Brochure from Fire Sprinkler Fittings Co. dated Aug. 1986.
"Standard for the Installation of Sprinkler Systems", NFPA 13, 1983 Edition, pp. 13-135.

Primary Examiner—John Rivell
Attorney, Agent, or Firm—Burns, Doane, Swecker & Mathis

[57] ABSTRACT

A valve and an arrangement for testing and draining a fire suppression water sprinkler system includes a valve which has a valve member with first, second and third ports which are provided at right angles to one another. The selective rotation of the valve member interrupts a flow of water through the valve and permits a flow at two different preselected flow rates.

54 Claims, 15 Drawing Sheets

U.S. PATENT DOCUMENTS

| | | | |
|---|---|---|---|
| 3,386,461 | 6/1968 | Fisher | 251/207 |
| 3,517,554 | 6/1970 | Smith | 73/332 |
| 3,525,363 | 8/1970 | Gore et al. | |
| 3,567,176 | 3/1971 | Johnson | |
| 3,604,631 | 9/1971 | Etter | 239/414 |
| 3,674,238 | 7/1972 | Pickles et al. | |
| 3,817,097 | 6/1974 | Heroux | 73/168 |
| 3,854,497 | 12/1974 | Rosenberg | 137/557 |
| 3,939,871 | 2/1976 | Dickson | 137/625.47 |
| 3,986,397 | 10/1976 | Perreault | 73/193 R |
| 4,108,207 | 8/1978 | Doody | 137/625 |
| 4,130,128 | 12/1978 | Kaneko | 251/207 |
| 4,177,832 | 12/1979 | Price | 251/315 |
| 4,208,033 | 6/1980 | Kesterman | |
| 4,244,393 | 1/1981 | Lehtinen | 137/559 |
| 4,273,152 | 6/1981 | Freeman | 251/315 |
| 4,399,977 | 8/1983 | Wheatley | |
| 4,643,224 | 2/1987 | Rung | 137/559 |
| 4,655,078 | 4/1987 | Johnson | 73/168 |
| 4,657,222 | 4/1987 | Tuillo | |

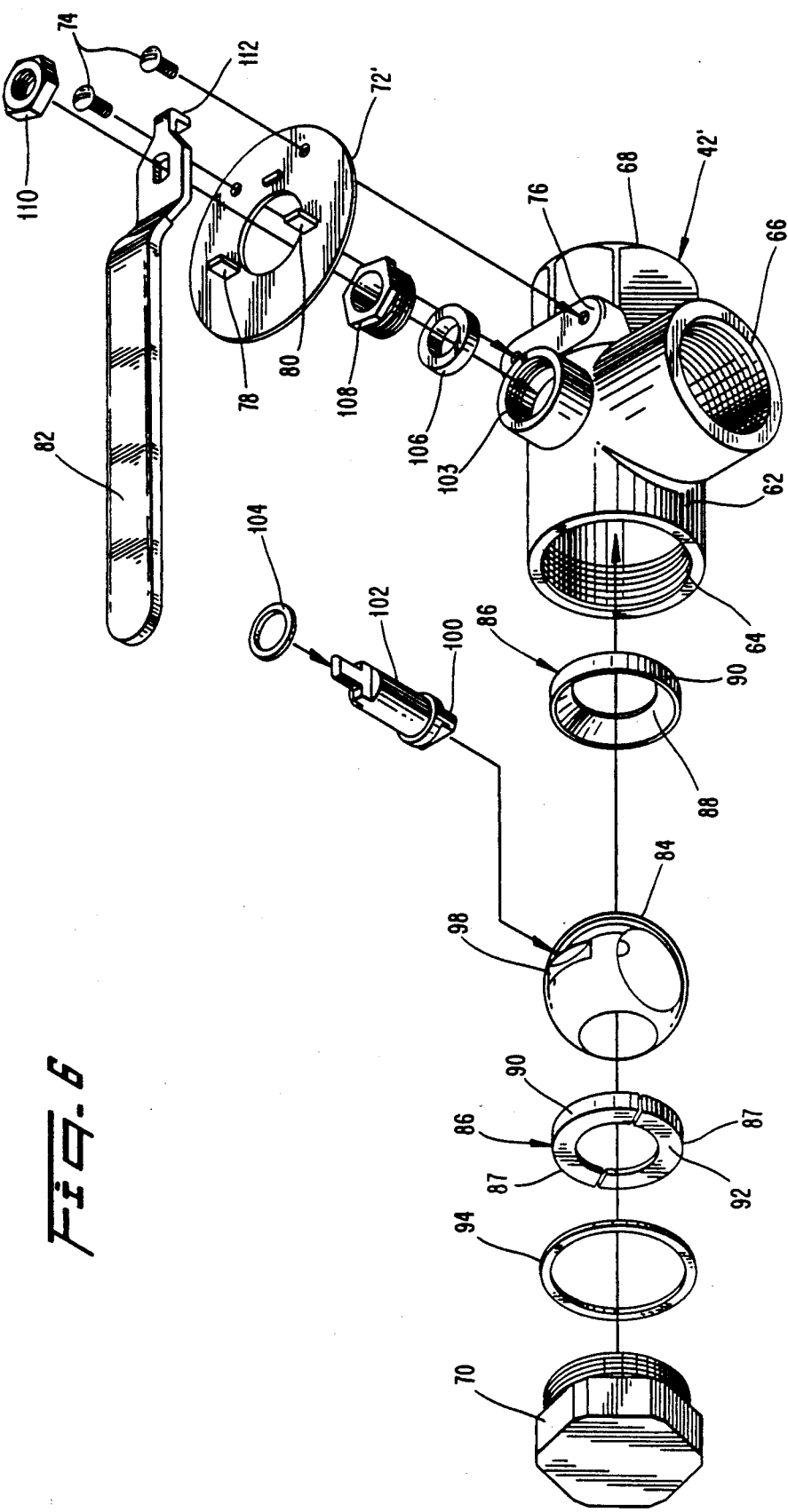

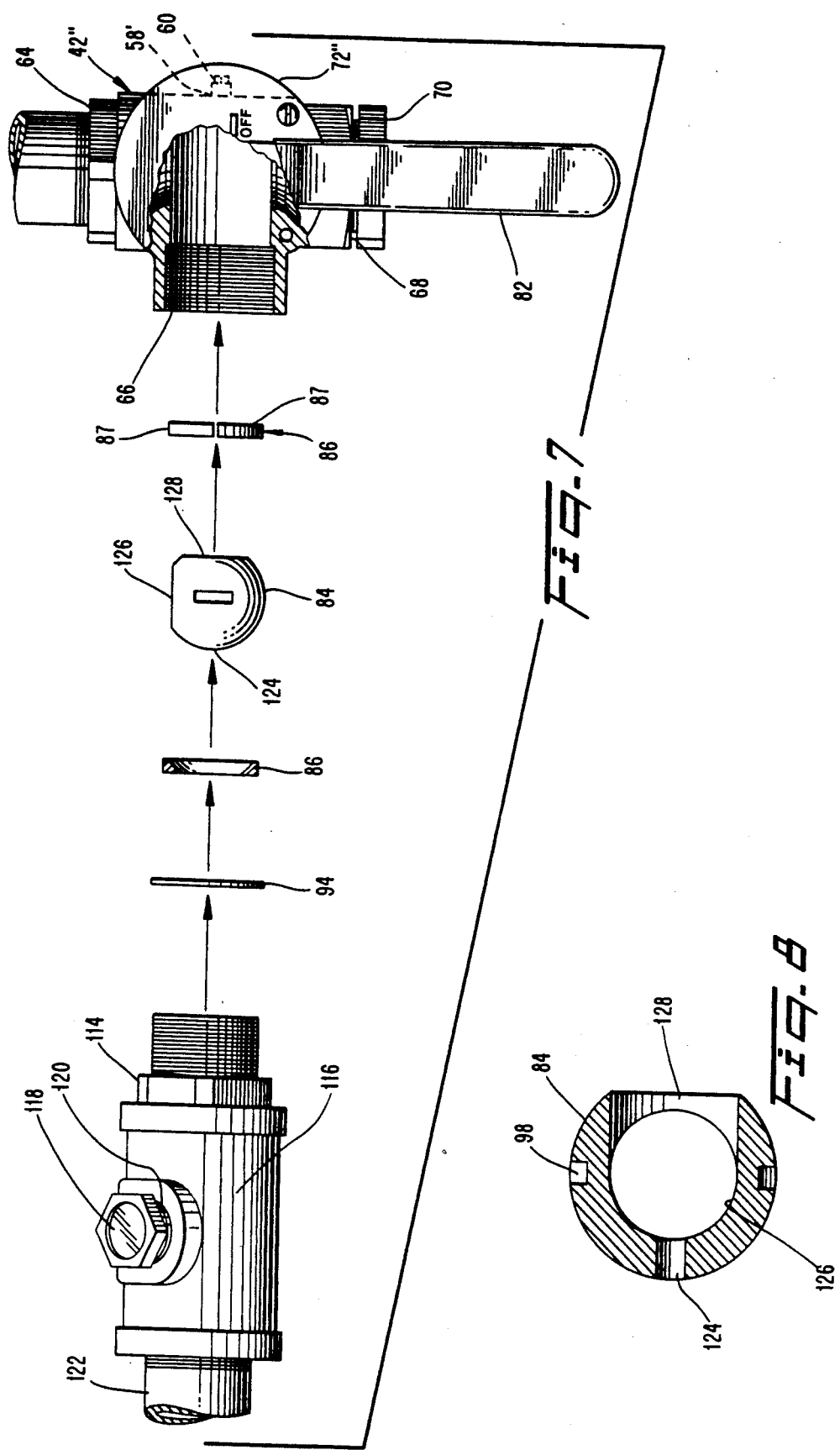

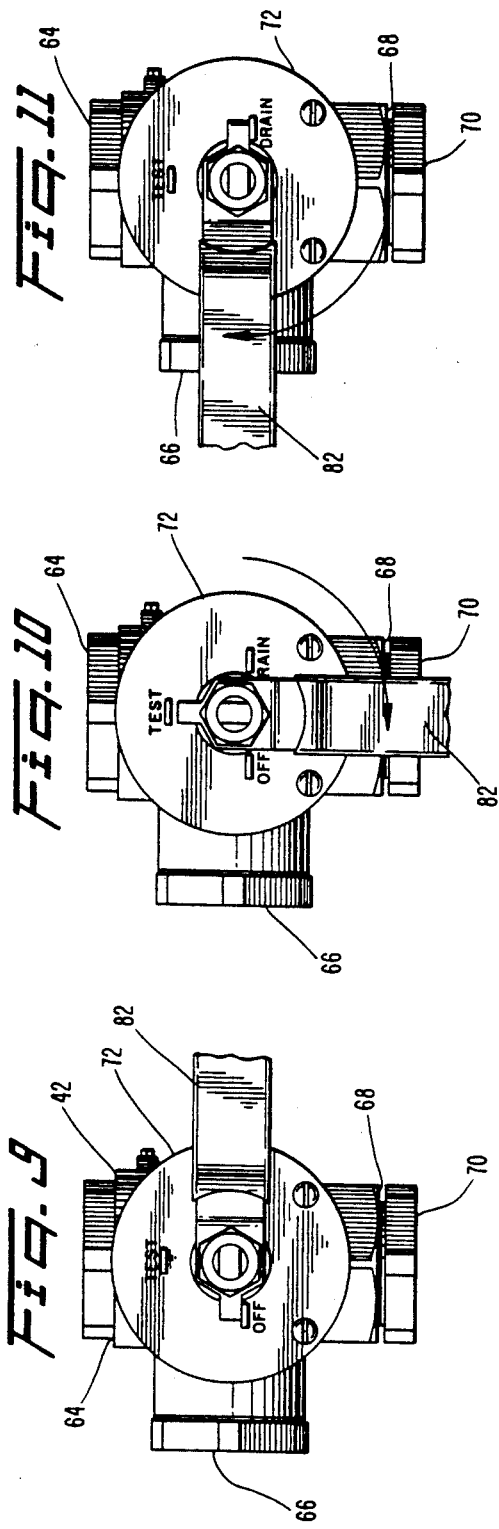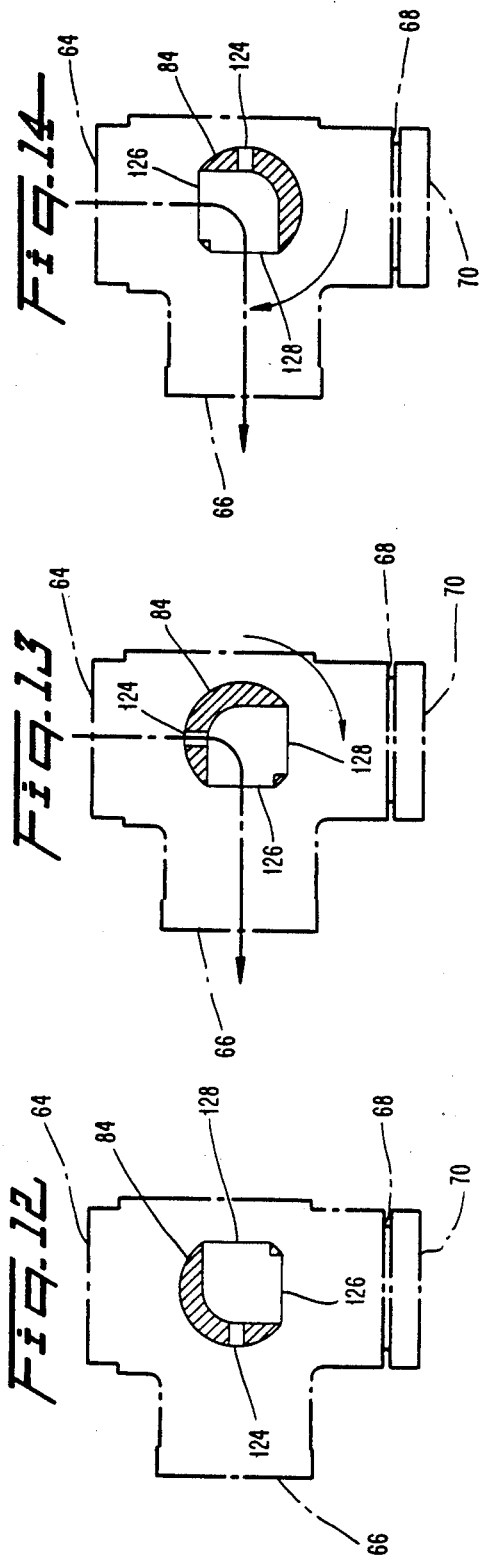

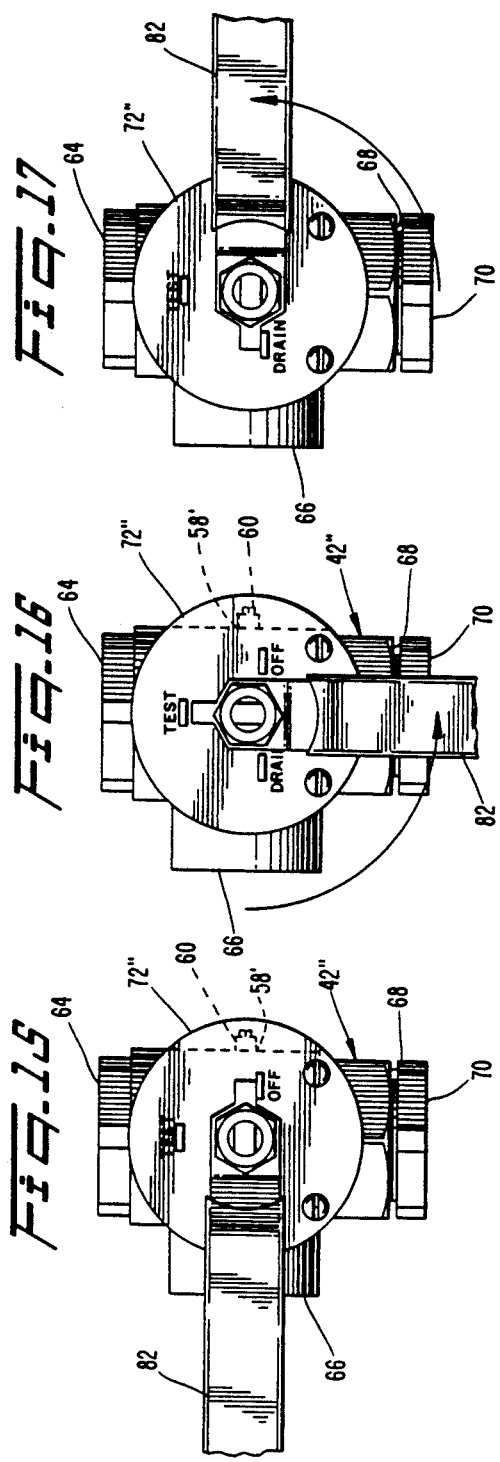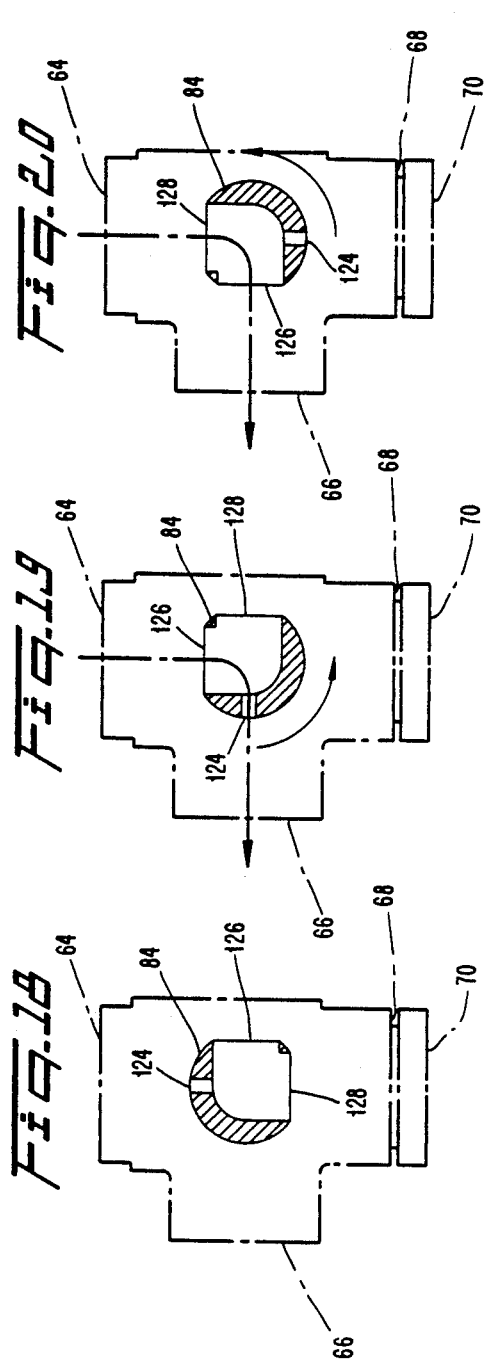

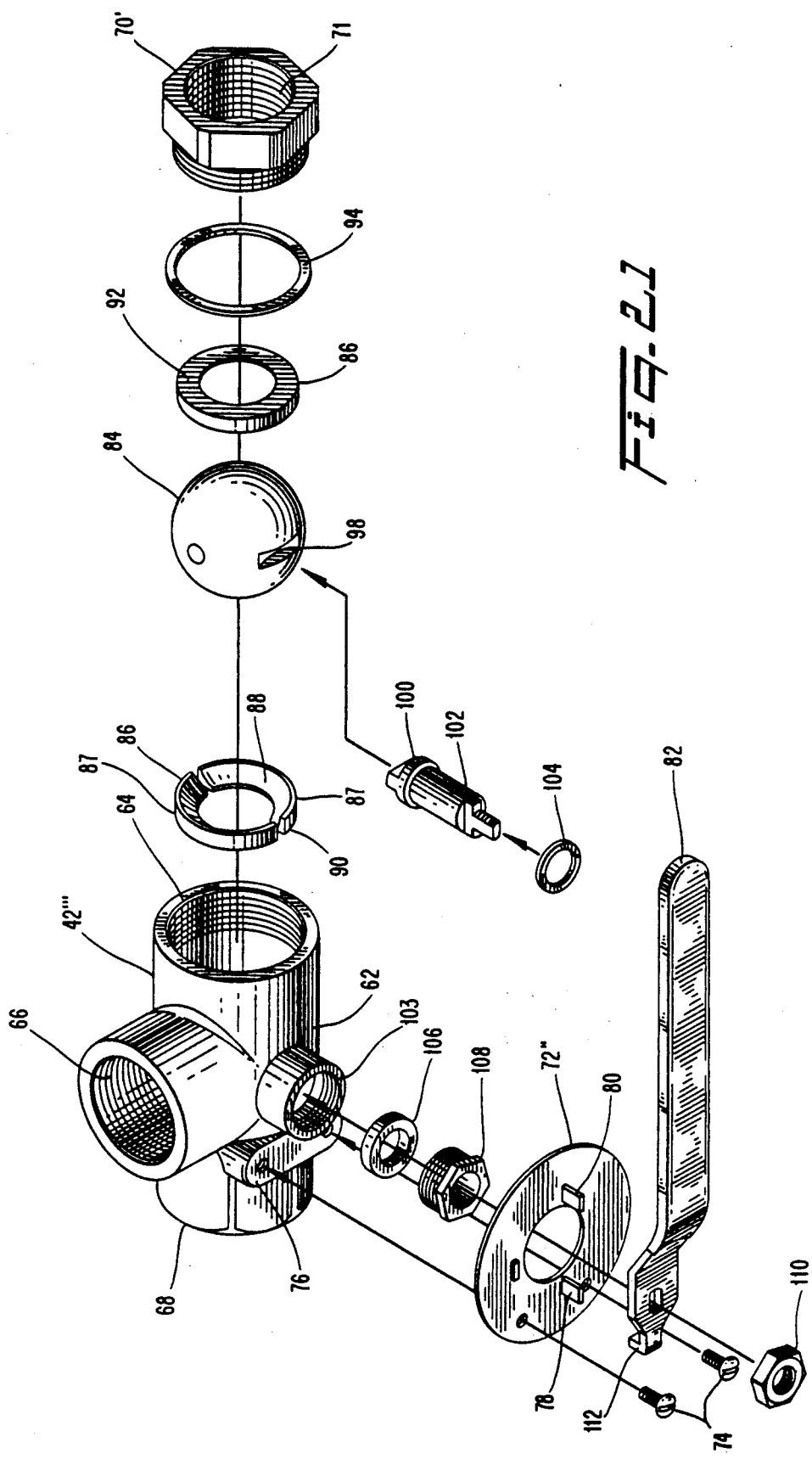

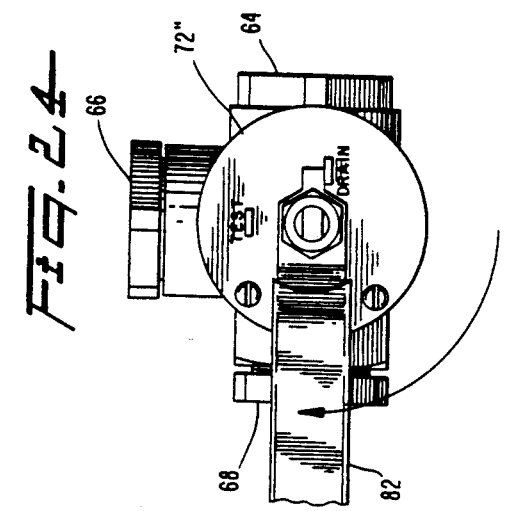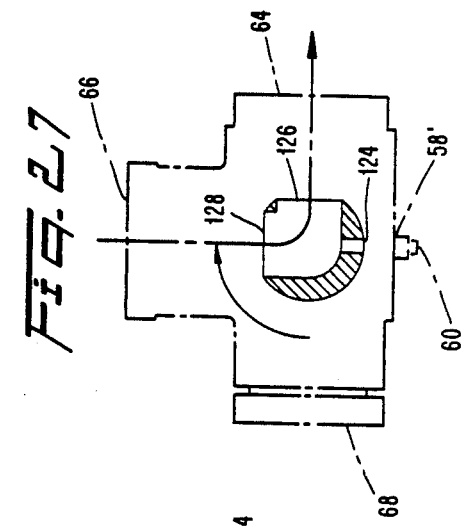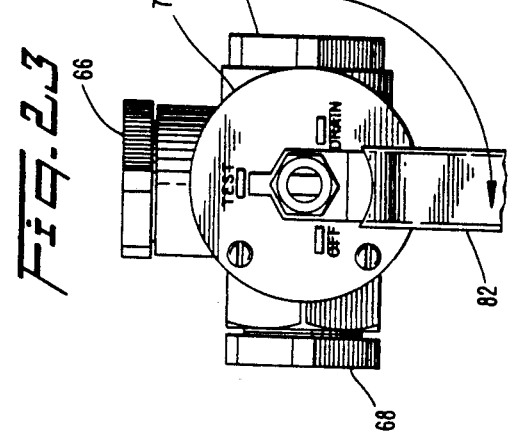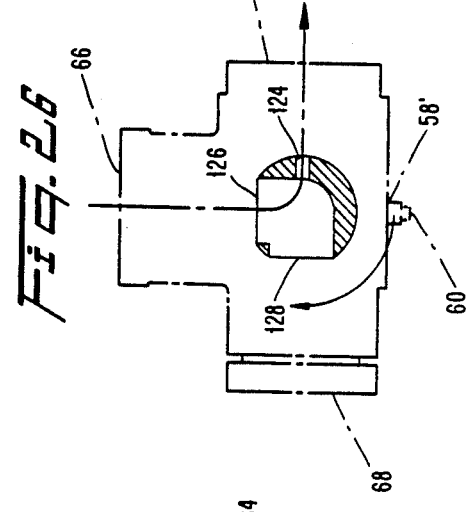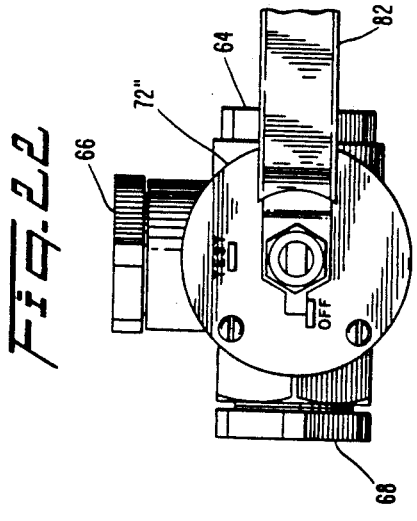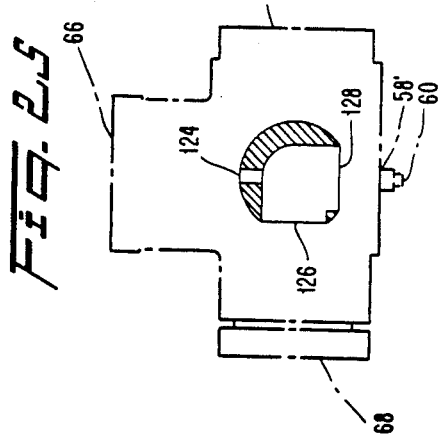

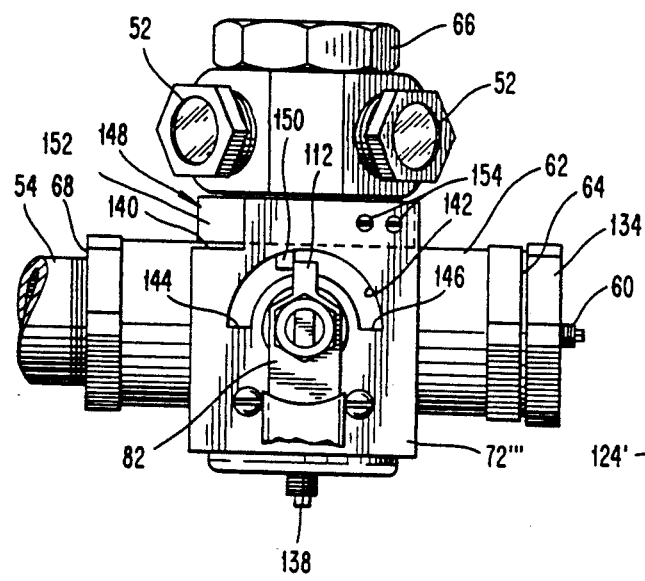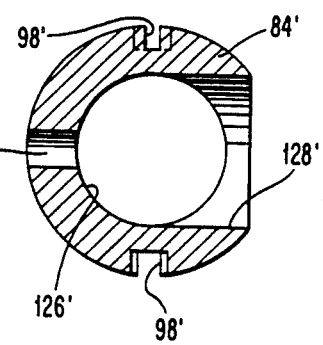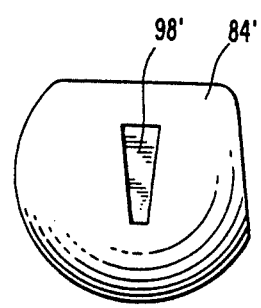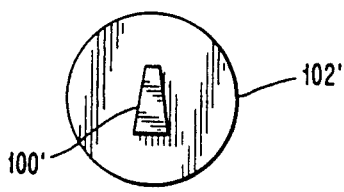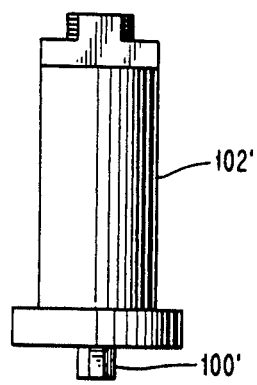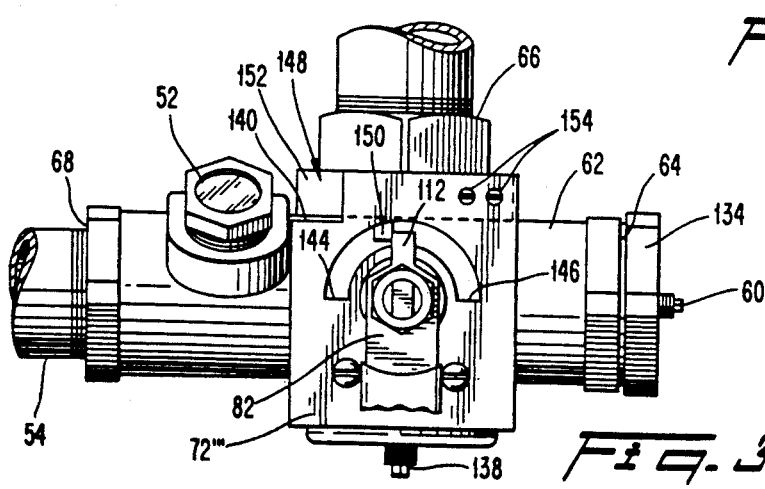

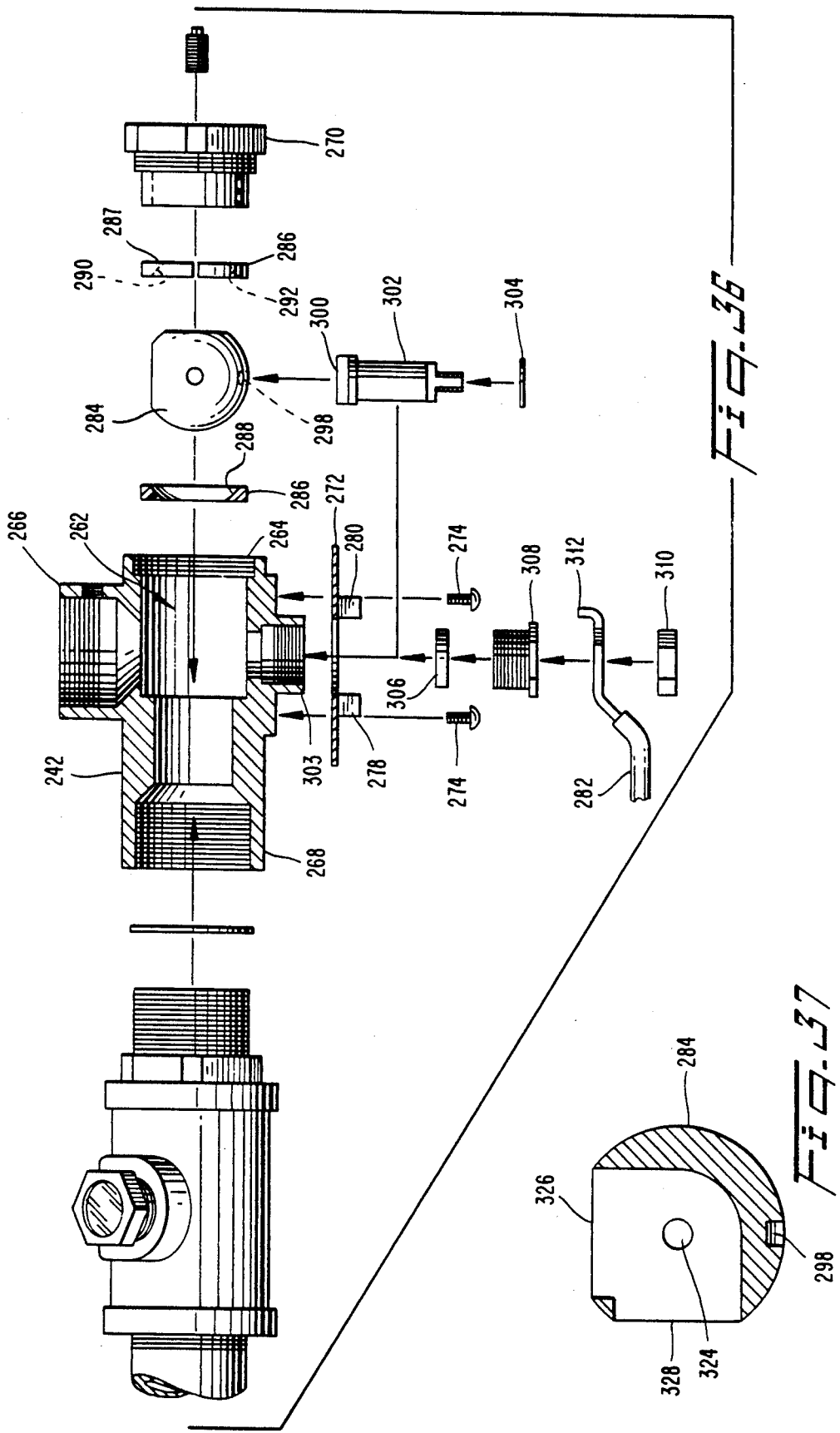

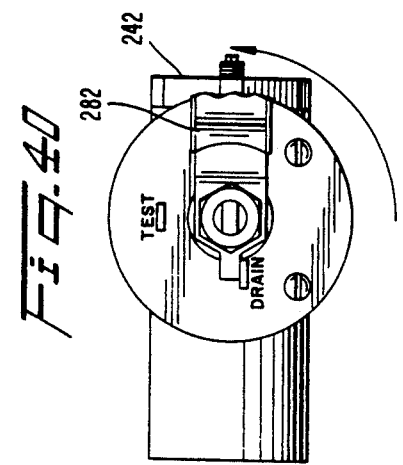
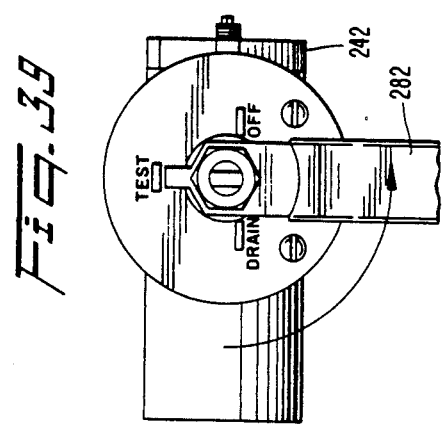
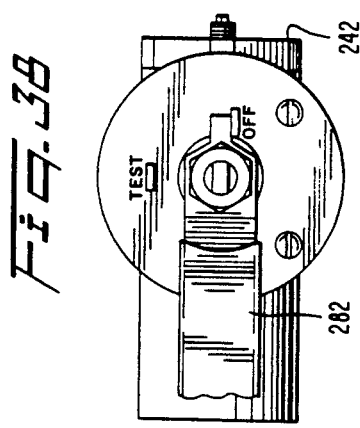
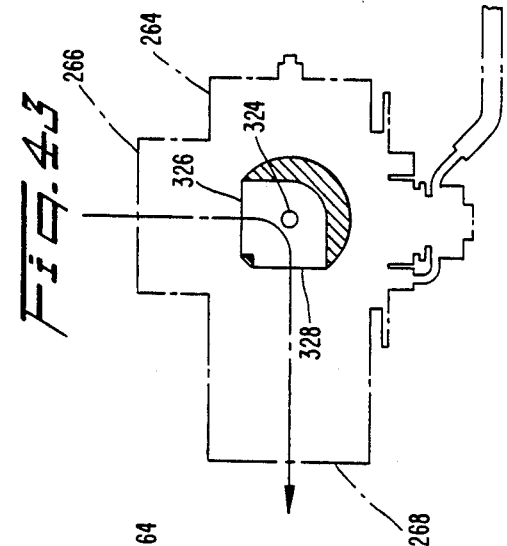
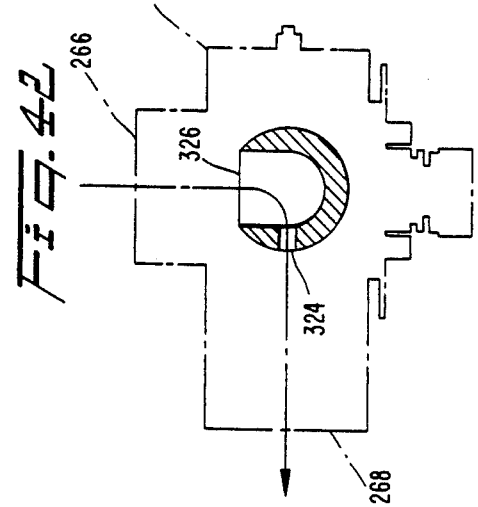
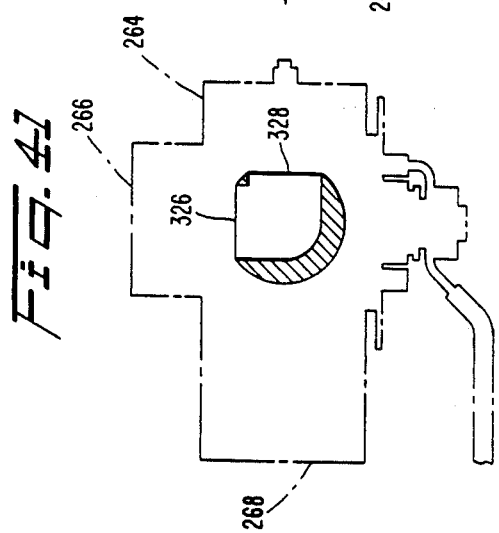

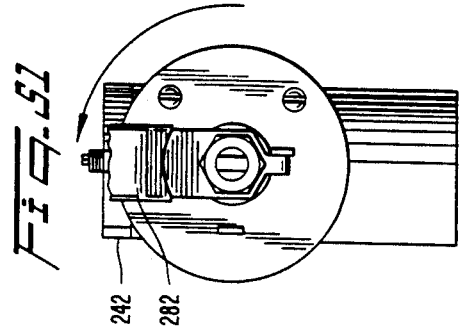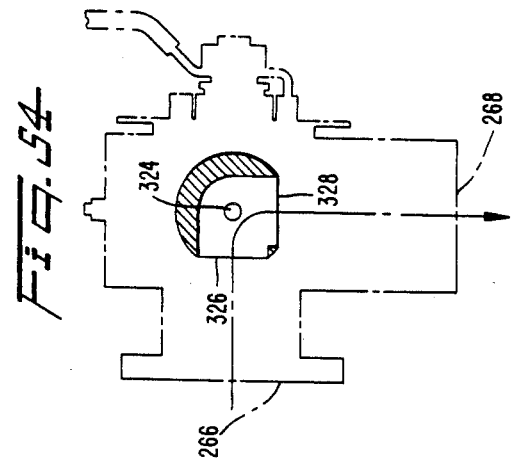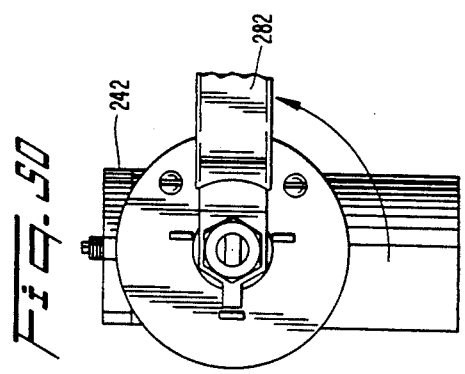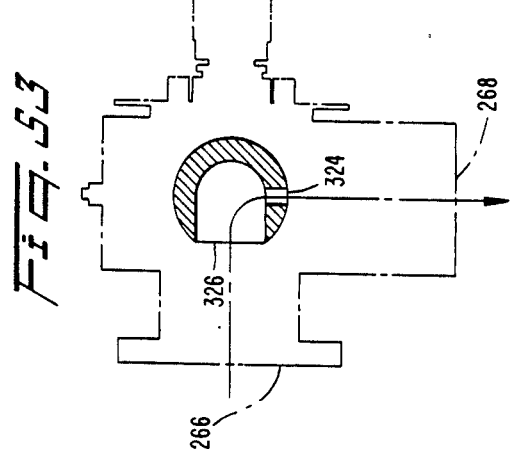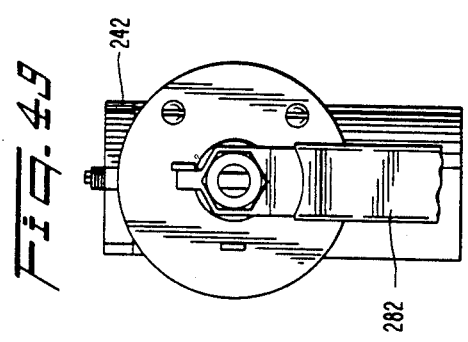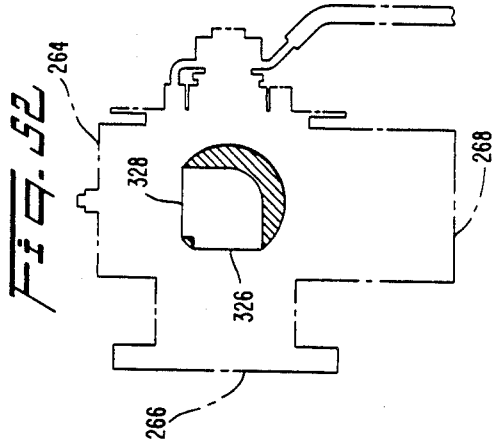

VALVE AND ARRANGEMENT FOR FIRE SUPPRESSION WATER SPRINKLER SYSTEM

This application is a continuation-in-part application of my copending application entitled Valve and Arrangement for Fire Suppression Water Sprinkler System, Ser. No. 138,436, filed on Dec. 28, 1987, now issued as U.S. Pat. No. 4,852,610, which is in turn a continuation-in-part application of Application S.N. 881,270, filed on July 2, 1986, now issued as U.S. Pat. No. 4,741,361 which in turn is a continuation-in-part application of my application of the same title, Ser. No. 874,653, filed on June 16, 1986, now abandoned.

BACKGROUND AND SUMMARY OF THE PRESENT INVENTION

The present invention relates generally to valves and more particularly relates to valve arrangements for use in testing and draining fire suppression water sprinkler systems.

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a fire sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers (after the supply of water to the main conduit has been turned off and after the system has been drained) will not result in a flow of water through the fitting for the water sprinkler. Accordingly, it is conventional in the art to provide a valve which when opened will drain the water conduits of the system.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

In addition, it is desirable (and sometimes required by the applicable fire code) to be able to visually observe the flow of water from the testing valve. Since the testing valve (and oftentimes the drainage valve) is frequently connected directly to a drain pipe, it is conventional to provide a sight glass downstream of the testing valve (and sometimes the drainage valve). It is, of course, possible to alternatively place a sight glass upstream of the testing valve. Also, since it is typically desirable to determine the pressure of the water upstream of the testing valve, prior to and during a test operation, it is conventional to provide a fitting or port to receive a pressure gauge upstream of the testing valve.

The use of separate drainage valves and testing valves results in significant time and expense during the installation of such plumbing. More recently, the testing valve and the drainage valve have been incorporated into a single device along with a sight glass and a pressure port. One such device is provided by the Fire Protection Division of Victaulic in Easton, Penn. under the designation "Testmaster". Such a device remains relatively expensive and cumbersome, however, since the device includes two separate valves that have been provided in a single housing.

Accordingly, it is an object of the present invention to provide a valve and arrangement for a fire suppression water sprinkler system which overcomes the disadvantages of the prior art.

Yet another object of the present invention is to provide an arrangement for testing and draining a fire suppression water sprinkler system which is relatively simple and easy to install and use.

Still another object of the present invention is to provide an arrangement for testing and draining a fire suppression water sprinkler system which is relatively inexpensive.

Yet still another object of the present invention is to provide a valve which permits a fire suppression water sprinkler system to be tested and drained.

A still further object of the present invention is to provide a valve which provides two different flow rates for a supply of fluid through the valve.

An additional object of the invention is to provide an arrangement which permits an easy observation of the flow of water through the valve.

These and other objects are accomplished by a valve and an arrangement for testing and draining a fire suppression system according to the present invention.

The arrangement according to the present invention comprises a conduit for supplying water to a plurality of sprinklers with a sensor provided for sensing the flow of water in the conduit. A valve is provided downstream of the sensor in communication with the conduit.

The valve has a housing which defines an interior chamber with an inlet and at least one outlet. A valve member provided within the interior chamber has a turning axis and first, second and third ports arranged at right angles to one another. The first port has a size which is different than the second and third ports. A surface of the valve member is selectively sealingly received by a seat member adjacent the outlet. If the valve has a second outlet, a plug member is provided for closing off the second outlet. A moving member selectively moves the valve member within the interior chamber, whereby communication between the inlet and the outlet may be sequentially closed, opened to a first preselected flow rate and then opened to a second preselected flow rate. The second preselected flow rate is greater than the first preselected flow rate.

In another preferred embodiment of the present invention, the valve has a housing which defines an interior chamber with an inlet and at least one outlet. A valve member provided within the interior chamber has a turning axis and first, second and third ports arranged at right angles to one another with one of the ports provided in parallel with the turning axis. One of the ports has a size which is different than at least one of the other two ports. A surface of the valve member is selectively sealingly received by a seat member adjacent one of the outlets. If the valve housing has first and second outlets, a plug member is provided for closing off one of the first and second outlets and a moving member selectively moves the valve member within the interior chamber, whereby communication between the inlet and the other of the outlets may be sequentially closed, opened to a first preselected flow rate and then opened to a second preselected flow rate. The second preselected flow rate is greater than the first preselected flow rate. The plug member closes off the one outlet during all of the sequential movements of the valve members.

Additionally, a sight glass housing may be provided, either as a unitary portion of the valve housing or as a separate element, which presents two sight glasses at a substantially 90 degree angle to one another so as to simplify the task of determining whether water is flowing past the sight glass housing. For example, by providing two sight glasses, light is permitted to enter one of the glasses at an angle to the line of vision through the other sight glass so as to illuminate the interior of the sight glass housing.

BRIEF DESCRIPTION OF THE DRAWINGS

Preferred embodiments of the present invention will be described in greater detail with reference to the accompanying drawings, wherein like members bear like reference numerals and wherein:

FIG. 6 is an exploded view of the valve of FIG. 5;

FIG. 7 is an exploded view of another left-handed valve according to the present invention;

FIG. 8 is a cross-sectional view of the valve member of the valve of FIG. 7;

FIG. 9 is a front view of the valve of FIG. 2 with the lever in the off position;

FIG. 10 is a front view of the valve of FIG. 2 with the lever in the test position;

FIG. 11 is a front view of the valve of FIG. 2 with the lever in the drain position;

FIG. 12 is a schematic view of the valve of FIG. 9 in partial cross-section;

FIG. 13 is a schematic view of the valve of FIG. 10 in partial cross-section;

FIG. 14 is a schematic view of the valve of FIG. 11 in partial cross-section;

FIG. 15 is a front view of the valve of FIG. 7 with the lever in the off position;

FIG. 16 is a front view of the valve of FIG. 7 with the lever in the test position;

FIG. 17 is a front view of the valve of FIG. 7 with the lever in the drain position;

FIG. 18 is a schematic view of the valve of FIG. 15 in partial cross-section;

FIG. 19 is a schematic view of the valve of FIG. 16 in partial cross-section;

FIG. 20 is a schematic view of the valve of FIG. 17 in partial cross-section;

FIG. 21 is an exploded view of another valve according to the present invention;

FIG. 22 is a front view of the valve of FIG. 21 with the lever in the off position;

FIG. 23 is a front view of the valve of FIG. 21 with the lever in the test position;

FIG. 24 is a front view of the valve of FIG. 21 with the lever in the drain position;

FIG. 25 is a schematic view of the valve of FIG. 22 in partial cross-section;

FIG. 26 is a schematic view of the valve of FIG. 23 in partial cross-section;

FIG. 27 is a schematic view of the valve of FIG. 24 in partial cross-section;

FIG. 28 is a front view of another valve according to the present invention;

FIG. 29 is a cross-sectional view of another valve member construction which may be employed in the illustrated embodiments of the invention;

FIG. 30 is a top view of the valve member of FIG. 29;

FIG. 31 is a side view of a stem member which cooperates with the valve member of FIG. 29;

FIG. 32 is a bottom view of the stem member of FIG. 31;

FIG. 33 is a front view of yet another valve according to the present invention;

FIG. 36 is an exploded view of the valve of FIG. 35;

FIG. 37 is a cross-sectional view of the valve member of the valve of FIG. 36;

FIG. 38 is a front view of the valve of FIG. 35 with the lever in the off position;

FIG. 39 is a front view of the valve of FIG. 35 with the lever in the test position;

FIG. 40 is a front view of the valve of FIG. 35 with the lever in the drain position;

FIG. 41 is a schematic view of the valve of FIG. 38 in partial cross-section;

FIG. 42 is a schematic view of the valve of FIG. 39 in partial cross-section;

FIG. 43 is a schematic view of the valve of FIG. 40 in partial cross-section;

FIG. 49 is a front view of the valve of FIG. 45 with the lever in the off position;

FIG. 50 is a front view of the valve of FIG. 45 with the lever in the test position;

FIG. 51 is a front view of the valve of FIG. 45 with the lever in the drain position;

FIG. 52 is a schematic view of the valve of FIG. 49 in partial cross-section;

FIG. 53 is a schematic view of the valve of FIG. 50 in partial cross-section; and FIG. 54 is a schematic view of the valve of FIG. 51 in partial cross-section.

DETAILED DESCRIPTION OF THE PREFERRED EMBODIMENTS

Figure 1:
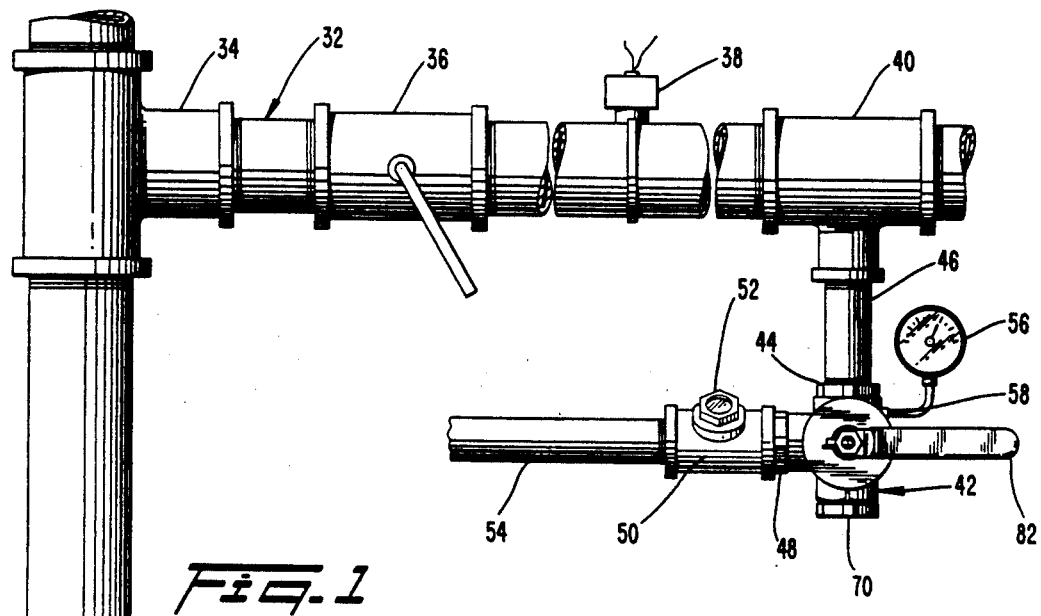
FIG. 1 is a front view of an arrangement for testing and draining a fire suppression water sprinkler system according to the present invention.

With reference to FIG. 1, an arrangement for testing and draining a fire suppression water sprinkler system includes a main conduit 30 for supplying water. The conduit 30 supplies a branch conduit 32 by way of a Tee fitting 34. A main valve 36 is provided for the branch conduit 32 with the main valve 36 operable to permit or to interrupt the flow of water through the branch conduit 32.

Downstream of the main valve 36 is provided a water flow switch 38. The water flow switch 38 is of suitable conventional design and typically includes a paddle or other member (not shown) which extends into the branch conduit 32. The paddle is connected to a switch which is closed when the flow of water through the branch conduit is sufficient to move the paddle a predetermined amount. Closure of the switch provides an electrical signal which may be used to trigger a fire alarm or to alert a fire department.

Downstream of the water flow switch 38 but upstream of a plurality of individual water sprinklers (not shown) is a Tee fitting 40. The Tee fitting 40 is preferably provided at a location which is physically lower than the portion of the branch conduit 32 downstream of the Tee fitting 40 and also physically lower than all of the individual water sprinklers and the associated system of supply conduits which is supplied with water by the branch conduit 32. In this way, the entire water sprinkler system downstream of the Tee fitting 40 may be drained as desired through the Tee fitting 40.

As is conventional in the art, the individual fire sprinklers (not shown) are provided with a member that melts when the ambient temperature reaches a predetermined level indicative of a fire. Upon melting, the member opens the fire sprinkler to spray water to suppress the fire.

When it is desired to replace one or more of the individual water sprinklers, the valve 36 is closed and then the water sprinkler system is preferably drained, so that the removal of one or more of the individual water sprinklers will not result in a flow of water through the fitting for the water sprinkler.

Figure 3:
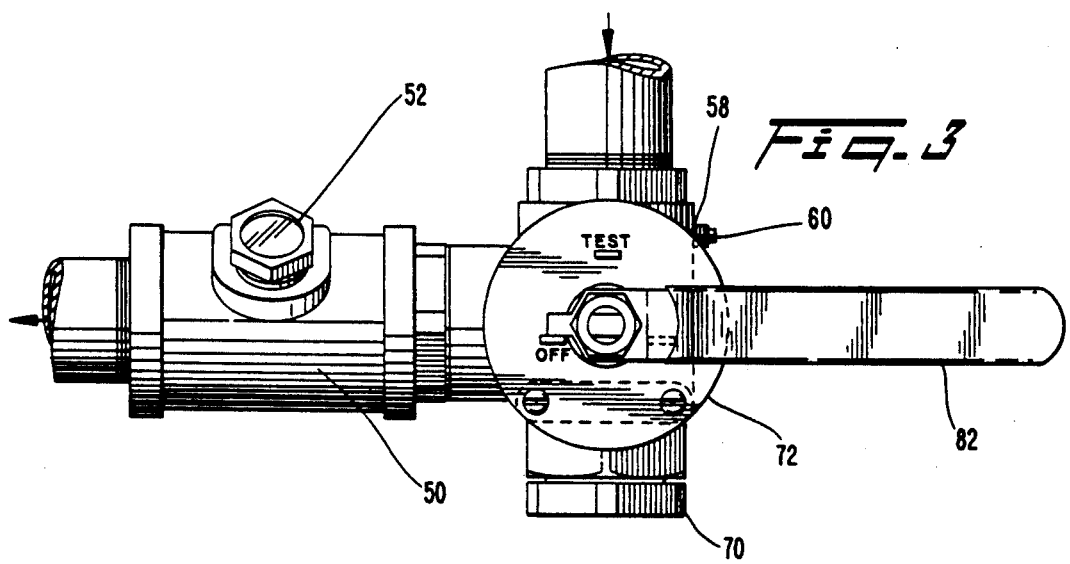
FIG. 3 is a front view of the valve of the arrangement of FIG. 1 with the pressure gauge removed.
Figure 4:
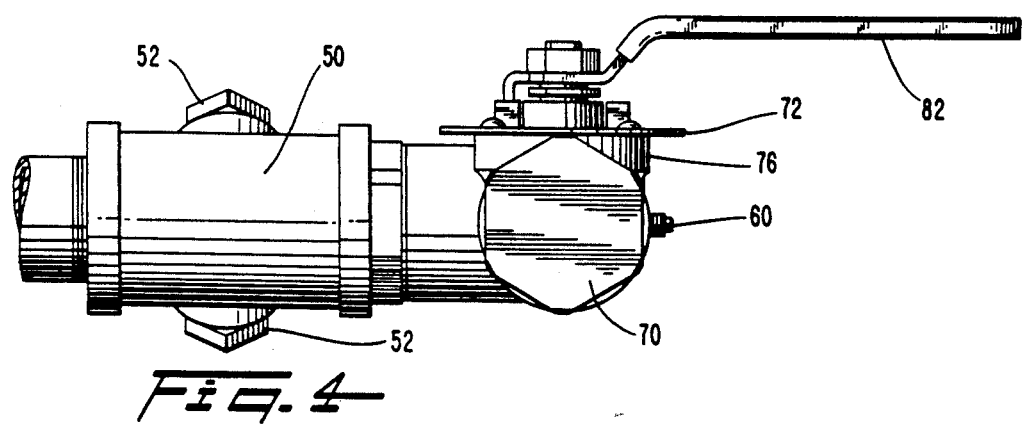
FIG. 4 is a bottom view of the valve of FIG. 3.

The Tee fitting 40 provides communication between the branch conduit 32 and a valve 42 according to the present invention (see also FIG. 3). The valve 42 has an inlet 44 which is threaded onto a nipple 46 which is in turn threaded into the Tee fitting 40. Other arrangements for connecting the inlet of the valve to the branch conduit 32 will be readily obvious to one skilled in the art. An outlet 48 of the valve 42 is connected to a fitting 50 having a pair of sight glasses 52 threadably received at two couplings of the fitting which are separated from each other by an angle of about 90 degrees.

As shown in FIG. 1, it is preferred that the sight glasses 52 on the housing 50 be offset 45 degrees to either side of a longitudinal line extending along the top of the fitting 50. However, it is understood that the primary considerations in determining the orientation of the sight glasses are the relationship between the housing and any obstructions, such as walls, that may interfere with a user's access to the sight glasses, and the ease of visibility of a flow through the sight glasses in any given orientation. For example, if a wall extends along the back side of the arrangement shown in FIG. 1, then it is preferred that the sight glasses be located in the housing either as shown, or in a position presenting both of the sight glasses at the front side of the arrangement.

Since a primary indicator of fluid motion through the housing 50 is air bubbles passing therethrough, it is preferred that at least one of the sight glasses be provided near the top of the housing so that air is trapped within the housing 50 adjacent the sight glass to facilitate viewing of the water and bubbles. However, other constructions are possible. For example, as will be discussed with respect to FIG. 32 below, the sight glasses may be oriented at a 90 degree angle to one another with each of the sight glasses being offset 45 degrees from a longitudinal line running along the front side of the nipple 46 so as to present the sight glasses upstream of the testing valve at the side of the valve on which a stop plate 72 is provided.

By employing the preferred sight glass arrangement, the visual observation of flow through the valve 42 is enhanced. For example, a light may be directed into one of the sight glasses furthest from the person checking the flow condition so as to illuminate the inside of the sight glass housing thus permitting the person to easily see the flow condition therein, typically by the passage of air bubbles through the sight glass housing.

An outlet of the fitting 50, in the embodiment of FIG. 1, is connected directly to a drain 54. Alternatively, the fitting 50 may be omitted and the outlet of the valve 42 may be left unconnected. In this way, the flow of water through the valve 42 would be visually observed without the use of a sight glass. If, however, no visual inspection of the flow of water is necessary, the outlet of the valve 42 may be connected directly to the drain 54.

The valve 42 is provided with a pressure gauge 56 which senses the pressure in the valve 42 at the inlet of the valve. The pressure gauge 56 is threadably received by a pressure port 58. If the pressure gauge 56 is omitted, a plug 60 is threadably received by the pressure port 58 (see FIG. 3).

Figure 2:
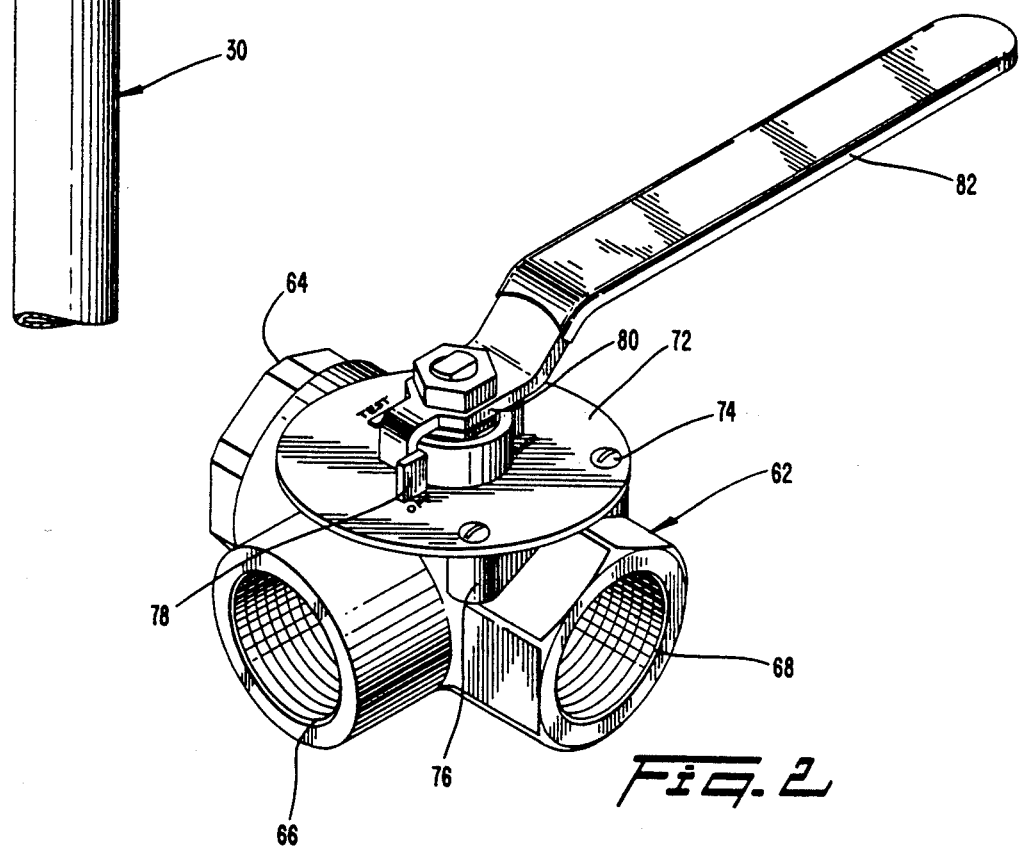
FIG. 2 is a pictorial view of a left-handed valve according to the present invention.

With reference now to FIG. 2, a valve 42 according to the present invention includes a housing 62 having three threaded openings 64, 66 and 68 which are coplanar and spaced apart by 90 degrees. When in use as in the arrangement of FIG. 1, the second opening 66 is the outlet of the valve and the first opening 64 is the inlet. The third opening 68 (which is not used as the inlet in FIG. 1) is normally closed by a plug 70. A stop plate 72 is mounted on the valve housing as by a pair of screws 74 which are threadably received by a mounting bracket 76 provided in the valve housing. The stop plate includes first and second shoulders 78, 80 which limit the movement of a control lever 82. The control lever is permitted by the stop plate to travel between "off", "test" and "drain" positions.

Figure 5:
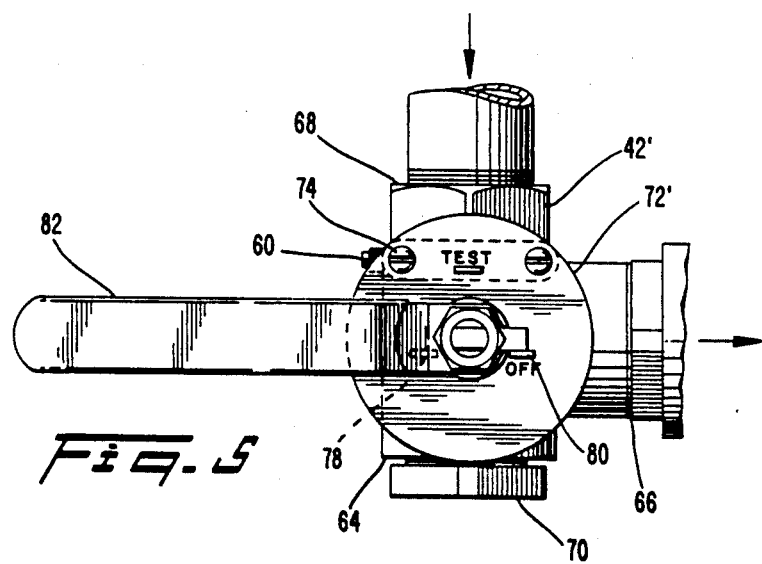
FIG. 5 is a front view of a right-handed valve according to the present invention.

If desired, the housing could be configured with only two openings 64, 66 provided at right angles to one another. By providing three openings 64, 66, 68, however, the valve may be readily converted from a left-handed valve to a right-handed valve as more fully discussed below. For example, the left-handed valve 42 of FIG. 1 could be readily adapted to be a right-handed valve 42' (see FIG. 5), if desired. In the valve 42', the second opening 66 is still the outlet for the valve, but the inlet is now the third opening 68. The first opening 64 is then closed by a suitable plug 70. The interior of the valve 42' must also be changed in the manner described below so as to accomplish the change from a left-handed valve to a right-handed valve and the stop plate 72 must also be changed to accommodate the reversed operation. Although not shown in the figures, it is possible to form the valve housing of a casting which includes untapped mounting brackets on both sides thereof so that a single casting may be used to construct either a right-handed or left-handed testing valve. In such a construction, once the type of valve desired is chosen, the necessary mounting bracket holes may be made and the testing valve assembled. In this manner, the number of manufactured parts necessary to produce right and left handed valves is reduced.

With reference now to FIG. 6, the right-handed valve 42' includes a ball member 84 which is received within an interior chamber of the housing 62 of the valve. In the valve 42' of FIG. 6, the housing is configured so as to receive the ball member 84 through the first opening 64. The ball member 84 is carried by a pair of annular seats 86 which have an inner surface 88 that conforms to the spherical shape of the ball member 84. The annular seat 86 adjacent the plug 70 is preferably comprised of two annular seat elements 87 which, when placed together in an end-to-end manner as shown, form a substantially complete ring. It is preferred that only about 2 to 4 degrees of gap space exist between the ends of the seat elements when they are in their proper positions in the valve 42' so that water is permitted to enter the seat cavity between the ends to pressurize the cavity. By this construction, it is possible to outfit the plug 70 with a tap for a pressure gauge as shown in FIG. 1, and to get a reliable reading due to the ability of water pressure to reach the tap through the elements 87. Alternatively, each annular seat 86 adjacent the plug 70 may be formed of a single seat element which includes a radially extending gap therein of about 2 to 4 degrees in width to permit the pressurization of the seat 86 in the valve 42'.

The seats 86 or seat elements 87, also have a peripheral surface 90 which is snugly urged into the interior chamber of the housing 62 by the ball member 84 when the assembly has been completed and which is forced against the interior chamber of the housing 62 by the pressure exerted on the seats 86 by the ball member 84. In addition, the seats 86 or seat elements 87 have an outer surface 92. The seat 86 which is positioned in the interior chamber of the housing ahead of the ball member abuts a shoulder (not shown) of the interior housing. The other seat 86 which is positioned in the interior chamber behind the ball member 84 is retained in position by a seal 94. The seal is provided between the seat 86 and a threaded retainer (i.e. plug 70) which releasably maintains the ball member and associated seats within the interior chamber of the housing. The retainer and one or more of the threaded openings 64, 66, 68 are provided with a hexagonal peripheral surface so as to facilitate assembly and disassembly of the valve 42'.

The ball member 84 is provided with a slot 98 which is adapted to receive a lowermost tab 100 of a stem 102. The stem is inserted into the valve housing 62 through a threaded opening 103 which is perpendicular to the openings 64, 66, 68. The stem is provided with an annular bearing 104 and is sealed by a packing 106. A threaded retainer 108 maintains the stem in secure engagement with the slot of the ball member 84.

The stop plate 72' is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the ball member 84 is likewise limited to movement between the "off", "test" and "drain" positions.

With reference now to FIG. 7, a valve 42" is configured so that the ball member 84 is received by the interior chamber of the housing 62 by way of the second opening 66. In this configuration, the seats 86 are likewise received in front of and behind the ball member 84 with the seal 94 positioned between the final seat 86 and a retainer 114. The first seat 86 or the seat elements 87 thereof (which is in front of the ball member) may be configured differently from the second seat 86, since the first seat generally only provides a bearing surface for the ball member 84.

The retainer 114 is provided as the inlet to a housing 116 which is adapted to mount a pair of sight glasses 118 in a pair of threaded openings 120. Downstream of the sight glasses 118 is provided an outlet 122 for the housing 116.

In the valve 42" of FIG. 7, a pressure port 58' is preferably provided directly opposite the outlet 48 of the valve. In this way (as more fully discussed below) the pressure port 58' will be in fluid communication with the inlet of the valve 42" regardless of whether the valve is configured for left-handed or right-handed operation.

The configuration of the valve 42" may be preferable over that of either valve 42 or 42' since the housing 116, as the retainer for the ball member 84, may not need to be disassembled from the valve 42" during installation in a fire suppression water sprinkler system. Moreover, since the pressurized side of the valves 42, 42' and 42" is the inlet side of the valve, it may be desirable or necessary that a seat for the ball member be provided adjacent the outlet of the valve. In this way, the water pressure tends to urge the ball member against the seat in a sealing manner rather than possibly away from the seat so as to result in leakage.

In FIG. 8, the ball member 84 is provided with a first port 124 having a cross-sectional area corresponding to the opening provided by one of the individual sprinklers in the fire suppression water sprinkler system. The first port 124 communicates with second and third ports 126, 128 provided in the ball member 84. The second and third ports 126, 128 have a cross-sectional area which is relatively large in comparison with the first port 124 so that the second and third ports can quickly drain the water sprinkler system. The first, second and third ports are perpendicular to one another and are coplanar so that rotation of the ball member about an axis perpendicular to all three ports can selectively bring the ports into (and out of) communication with the inlet and outlet of the valve. The slot 98 provided in the ball member 84 extends into the ball member in a direction perpendicular to the directions in which the central axes of each of the openings 124, 126, 128 extend. The slot also extends along the surface of the ball member in a direction parallel to the direction of the axis of the second opening 126.

As is discussed below with respect to FIGS. 29 and 30, a ball member 84' may be provided with a slot 98' which is tapered along the surface of the ball member to present a shape which is non-symmetrical about a center line extending through the ball member in a direction parallel to the central axes of the first and third ports. This slot 98' is matable with a lowermost tab 100' of a stem 102' so that the ball member and stem may only engage each other when the slot 98' and tab 100' are aligned. This construction ensures that the ball member ports are properly oriented with respect to the openings in the valve 42, 42' or 42'" discussed above, or the valve 42 "" discussed below.

While the preferred embodiments as described in the present application include a spherical shaped valve member, the present invention is readily adapted to other suitable, conventional valve configurations. For example, a plug valve (not shown) wherein the valve member comprises a truncated cone could be readily modified in accordance with the present invention by providing first, second and third ports in the valve member in the manner disclosed above.

With reference now to FIG. 9, the left-handed valve 42 of FIG. 3 (with the sight glass housing not shown) has the control lever 82 in the "off" position. Since in the valve 42, the seats are provided adjacent the first and third openings 64, 68, the ball member is positioned by the control lever so that a solid portion of the spherical outer surface of the ball member is oriented toward the inlet of the valve. With reference to FIG. 12, the first port 124 is positioned adjacent the second opening 66 and the second port 126 is positioned adjacent the third opening 68. The third port 128 is therefore positioned directly away from the second opening 66. Accordingly, water is not permitted to flow through the ball member from the inlet of the valve to the outlet.

With reference now to FIG. 10, the control lever has been rotated clockwise through 90 degrees to the "test" position. With reference to FIG. 13, a clockwise rotation of the ball member 84 through 90 degrees has presented the first port 124 adjacent the inlet of the valve. Water is therefore free to flow through the relatively small opening of the first port through the second port and then through the outlet of the valve.

With reference now to FIG. 11, the control lever has been rotated clockwise through an additional 90 degrees to the "drain" position. With reference to FIG. 14, a clockwise rotation of the ball member 84 through an additional 90 degrees has presented the second port 126 adjacent the inlet of the valve. Water is then free to flow through the second and third ports from the inlet to the outlet of the valve.

With reference now to FIG. 15, the left-handed valve 42" of FIG. 7 (with the sight glass housing not shown) has the control lever 82 in the "off" position. Since in the valve 42", the seats are provided adjacent and directly opposite the second opening 66, the ball member is positioned by the control lever so that a solid portion of the spherical outer surface of the ball member is oriented toward the outlet of the valve. With reference to FIG. 18, the first port 124 is positioned adjacent the first opening 64 and the second port 126 is positioned directly opposite the second opening 66. The third port 128 is therefore positioned adjacent the third opening 68. Accordingly, water is not permitted to flow through the ball member from the inlet of the valve to the outlet.

With reference now to FIG. 16, the control lever has been rotated counter-clockwise through 90 degrees to the "test" position. With reference to FIG. 19, a counterclockwise rotation of the ball member 84 through 90 degrees has presented the first port 124 adjacent the outlet of the valve. Water is therefore free to flow through the relatively large opening of the second port to the relatively small opening of the first port and then through the outlet of the valve.

With reference now to FIG. 17, the control lever has been rotated counter-clockwise through an additional 90 degrees to the "drain" position. With reference to FIG. 20, a counterclockwise rotation of the ball member 84 through an additional 90 degrees has presented the third port 128 adjacent the inlet of the valve with the second port 126 adjacent the outlet of the valve. Water is then free to flow through the third and second ports from the inlet to the outlet of the valve.

With reference again to FIG. 8, the same ball member 84 can be selectively positioned so as to provide the appropriate port adjacent the inlet or the outlet of a valve 42 wherein the seats are arranged adjacent the first and third openings of a valve 42" wherein the seats are arranged adjacent and opposite the second opening. Likewise, as will be readily obvious to one skilled in the art upon reading this detailed description of the preferred embodiments, the same ball member can be readily positioned so as to present the appropriate ports to the inlet and outlet of a left-handed valve 42 or a right-handed valve 42' (with the seats in either configuration). Accordingly, the ball member 84 is provided with two slots 98 so as to permit the ball member to be inverted as appropriate.

As shown in FIGS. 29 and 30, each of the slots 98' of a ball member 84' is formed in a shape which is non-symmetrical about a center line extending therethrough in a direction parallel to the central axis of the first port so that each of the ball member slots 98' may only be oriented one way with respect to a similarly shaped lowermost tab 100' of the stem 102' (both shown in FIGS. 31 and 32) when the ball member is arranged to present the slot 98' to the tab 100'. For example, each of the slots 98' may be tapered along the length thereof to present a slot shape which is non-symmetrical about a center line of the slot extending in a direction parallel to the central axis of the first port to the stem which may only be mated by a similarly shaped tapered tab. In order for the tapered slots 98' to properly present the ball member to the stem 102' the direction of tapering of one of the slots is opposite to the direction of tapering of the other of the slots. In this manner, when the ball member is rotated 180 degrees about the central axes of the first and third ports 124' and 128', the ports 124', 126', 128' are properly oriented with respect to the openings in the valve 42", 42'", and 42"".

With reference to FIGS. 9 to 14, in adapting a left-handed valve 42 to a right-handed orientation (not shown), the valve housing would be effectively rotated through 180 degrees about the axis of the stem 102. Although not shown in the figures, it is possible to form the valve housing of a casting which includes untapped mounting brackets on both sides thereof so that a single casting may be used to construct either a right or left handed testing valve. In such a construction, once the type of valve desired is chosen, the necessary mounting bracket holes may be made and the testing valve assembled. In this manner, the number of manufactured parts necessary to produce right and left handed valves is reduced. When reoriented for right-handed use, the first opening 64 would be closed by the plug 70. The third opening 68 would be the inlet for the valve. The second opening would remain as the outlet for the valve. The ball member would then be rotated through 180 degrees about an axis passing through the second port. This differs from the ball member 98' of FIGS. 29 and 30 which must be rotated about the axes of the first and/or third ports 124' and 128' in order to properly orient the ports with respect to the valve openings. As can be seen from FIGS. 9-14, when in the "off" configuration, the first port would be adjacent the second opening and the second port would be adjacent the first opening 64. The control lever would be rotated though 90 degrees in a counter-clockwise manner to move the first port so as to be adjacent the inlet of the valve to provide the "test" configuration. Further rotation of the control lever through 90 degrees in the counter-clockwise direction would bring the second port adjacent the inlet in the "drain" position. The stop plate would be replaced by a different stop plate appropriately labeled and with the tabs suitably positioned so as to permit rotation of the control lever through 180 degrees.

Similarly, with reference to FIGS. 15 to 20, in adapting a left-handed valve 42'' to a right-handed orientation (not shown), the valve would be effectively rotated through 180 degrees about the axis of the stem 102. Accordingly, the first opening 64 would be closed by the plug 70. The third opening 68 would be the inlet for the valve. The second opening would remain as the outlet for the valve. The ball member would then be rotated through 180 degrees about an axis passing through the first and third ports. When in the "off" configuration, the first port would be adjacent the inlet and the third port would be adjacent the first opening. The control lever would be rotated though 90 degrees in a clockwise manner to move the first port so as to be adjacent the outlet of the valve to provide the "test" configuration. Further rotation of the control lever through 90 degrees in the clockwise direction would bring the second port adjacent the outlet in the "drain" position. The stop plate would be replaced by a different stop plate appropriately labeled and with the tabs suitably positioned so as to permit rotation of the control lever through 180 degrees.

With continual reference to FIGS. 15-20, in either a left-handed or right-handed (not shown) configuration, the ball member 84 provides fluid communication between the inlet of the valve 42'' and the pressure port 58' when the control lever is in either the "off" or "test" positions. In this way, only a single pressure port 58' need be provided in the valve housing which is readily adaptable between left-handed and right-handed configurations.

With reference now to FIG. 21, another preferred embodiment of the present invention is provided by a valve 42''' in which the second opening 66 is the inlet of the valve and one of the first and third openings 64, 68 is the outlet of the valve. This configuration is highly preferred since the valve is readily converted from a left-handed configuration to a right-handed configuration and may be easily adapted from a conventional 3-way diversion valve such as is available from Conbraco Industries, Inc. under the trade name "APOLLO". The water pressure in the valve (when in use) urges the ball member against the seat adjacent the outlet in either a left-handed or right-handed configuration as described below.

With continued reference to FIG. 21, the valve 42''' is similar in configuration to that of FIG. 6 in that a ball member 84 is received within an interior chamber of the housing 62 of the valve. In the valve 42''' of FIG. 21, the housing is configured so as to receive the ball member 84 through the first opening 64. The ball member 84 is carried by a pair of annular seats 86 having inner surfaces 88 that conform to the spherical shape of the ball member 84. The annular seats 86 are each provided with a peripheral surface 90 which is snugly received by the interior chamber of the housing 62. The seat 86 which is positioned in the interior chamber of the housing ahead of the ball member abuts a shoulder (not shown) of the interior housing. The other seat 86 which is positioned in the interior chamber behind the ball member 84 is retained in position by a seal 94. The seal is provided between the seat 86 and a threaded retainer 70' which releasably maintains the ball member and associated seats within the interior chamber of the housing. The retainer 70' and one or more of the threaded openings 64, 66, 68 are provided with a hexagonal peripheral surface so as to facilitate assembly and disassembly of the valve 42'''.

Since the opening 64 is the outlet of the valve 42''' in the illustrated configuration, the retainer 70' has a threaded opening 71 therein to receive a pipe to drain and the annular seat 86 adjacent thereto includes no gap therein. As desired, the retainer 70 could be replaced by a suitably configured sight glass arrangement 50 (see FIG. 1). If the valve 42''' were arranged for left-handed operation, the retainer 70' would close the opening 64 and would be in the form of a plug 70 (see FIG. 6). As shown in FIG. 21, the annular seat 86 inserted into the interior chamber in front of the ball member 84 may include annular elements 87 forming a gap to permit pressure to reach the outlet 68 where, e.g. a pressure tap (not shown) may be located.

The ball member 84 is provided with a slot 98 which is adapted to receive a lowermost tab 100 of a stem 102. The stem is inserted into the valve housing 62 through a threaded opening 103 which is perpendicular to the openings 64, 66, 68. The stem is provided with an annular bearing 104 and is sealed by a packing 106. A threaded retainer 108 maintains the stem in secure engagement with the slot of the ball member 84.

A stop plate 72'' is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the ball member 84 is likewise limited to movement between the "off", "test" and "drain" positions.

A pressure port 58' may be provided directly opposite the inlet opening 66 of the valve 42''', (see FIGS. 25-27) so that the pressure port is in fluid communication with the inlet of the valve regardless of whether the valve is configured for left-handed or right-handed operation. Alternatively, the pressure port 58' could be located at another position on the valve housing (such as adjacent the second opening 66) in order to provide a desired communication with the pressure within the valve housing. Alternative embodiments of this reversible type arrangement are, of course possible. For example, the valve housing inlets and outlets may be secured to the valve housing in such a way as to permit their removal from the valve housing. By such a construction, the inlets and outlets could be rearranged on the valve housing to adapt the housing for either left or right handed use, thus reducing the number of parts necessary for making left and right handed valves.

With reference now to FIG. 22, the right-handed valve 42''' of FIG. 21 (with a sight glass housing not shown) has the control lever 82 in the "off" position.

Since in the valve 42''', the seats are provided adjacent the first and third openings 64, 68, the ball member is positioned by the control lever so that a solid portion of the spherical outer surface of the ball member is oriented toward the outlet of the valve. With reference to FIG. 25, the first port 124 is positioned adjacent the second opening 66 and the second port 126 is positioned adjacent the third opening 68. The third port 128 is therefore positioned directly away from the second opening 66. Accordingly, water is not permitted to flow through the ball member from the inlet of the valve to the outlet.

With reference now to FIG. 23, the control lever has been rotated clockwise through 90 degrees to the "test" position. With reference to FIG. 26, a clockwise rotation of the ball member 84 through 90 degrees has presented the first port 124 adjacent the outlet of the valve. Water is therefore free to flow through the second port and through the relatively small opening of the first port and then through the outlet of the valve.

With reference now to FIG. 24, the control lever has been rotated clockwise through an additional 90 degrees to the "drain" position. With reference to FIG. 27, a clockwise rotation of the ball member 84 through an additional 90 degrees has presented the second port 126 adjacent the outlet of the valve. Water is then free to flow through the third and second ports from the inlet to the outlet of the valve.

As will be readily obvious to one skilled in the art upon reading this detailed description of the preferred embodiments, the same ball member can be readily positioned so as to present the appropriate ports to the inlet and outlet of a left-handed valve or a right-handed valve 42'''. Accordingly, the ball member 84 is provided with two slots 98 so as to permit the ball member to be inverted as appropriate. Additionally, as discussed above with respect to the ball member 84' shown in FIGS. 29 and 30, a tapered slot 98' may be employed along with a stem 102' having a similarly tapered lower-most tab 100' as shown in FIGS. 31 and 32, to prevent the ball member from being improperly oriented with respect to the ports in the left-handed or right-handed embodiments of the valve 42'''.

With reference again to FIGS. 22 to 27, in adapting a right-handed valve 42''' to a left-handed orientation (not shown), the retainer 70' would be replaced by a plug retainer 70 (not shown). Accordingly, the first opening 64 would be closed by the plug retainer 70. The third opening 68 would be the outlet for the valve. The second opening would remain as the inlet for the valve. The ball member (see FIG. 25) would then be rotated through 180 degrees about an axis passing through the first and third ports. When in the "off" configuration, the first port would be adjacent the second opening and the second port would be adjacent the first opening 64. In the "off" position, the handle of the control lever would extend to the left and the control lever would be rotated though 90 degrees in a counter-clockwise manner to move the first port so as to be adjacent the outlet of the valve to provide the "test" configuration. Further rotation of the control lever through 90 degrees in the counterclockwise direction would bring the second port adjacent the outlet in the "drain" position. The stop plate would be replaced by a different stop plate appropriately labeled and with the tabs suitably positioned so as to permit rotation of the control lever through 180 degrees.

A further embodiment of a valve 42'''' according to the present invention is illustrated in FIG. 28. As shown in the figure, the valve 42'''' is similar to the valve 42''' shown in FIG. 21 in that the opening 66 serves as the inlet to the valve and the openings 64 and 68 extend to either side of the housing 62. In the valve 42'''' of FIG. 28 however, the sight glass housing is formed integrally with the valve at an upstream side thereof between the inlet opening 66 and the valve chamber in which the ball member 84 is held. By this construction, the assembly operation of a system incorporating the invention is simplified by reducing the number of parts needed and the proper orientation of the sight glasses 52 is guaranteed. Alternatively, the sight glasses 52 may be integrally formed adjacent either of the outlet openings 64, 68 of the valve if desired. An embodiment illustrating this construction is shown in FIG. 33, in which the sight glasses are formed in the valve housing between the internal chamber and the outlet 68.

In another alternative embodiment (not illustrated), the outlets 64 and 68 of the housing are designed to mate with an arrangement including two outlet fixtures mating with the outlets 64 and 68 and presenting threaded outlets 171, 173. These outlet fixtures may be held to the valve housing by a plurality of bolts 175 extending across the housing between the outlet fixtures. By this construction, reversal or replacement of the valve housing is simplified.

In order to permit the valve 42'''' to be most easily adaptable for use in the right and left handed modes, the openings 64, 68 are provided with identical threaded openings and a plug 134 and outlet pipe member 54 are provided with identical mating threaded ends so that the plug 134 and pipe member are interchangeable with respect to the two openings 64 and 68. In this manner, the valve housing need not be reoriented in order for the valve to be switched, e.g. from a right-handed mode of operation to a left-handed mode of operation. Although not shown in the figures, it is possible to form the valve housing of a casting which includes untapped mounting brackets on both sides thereof so that a single casting may be used to construct either a right or left handed testing valve. In such a construction, once the type of valve desired is chosen, the necessary mounting bracket holes may be made and the testing valve assembled. In this manner, the number of manufactured parts necessary to produce right and left handed valves is reduced. In order to further carry out the reorientation, the plug 134 and the outlet pipe member 54 are interchanged and the ball member 84 or 84' is rotated 180 degrees about the axes of the first and third ports 124, 128 or 124', 128'. In addition, since the direction of rotation of the lever (not shown in FIG. 28) changes between the left and right handed operations, it is necessary to replace the stop plate 72.

In the embodiment illustrated in FIG. 28, the stop plate 72''' is formed of a flat plate of rectangular shape and has a notch 140 in one corner thereof as well as an annular opening 142 in the region of travel of the tab 112 of the lever 82 (see FIG. 6). The annular opening 142 in the plate 72''' receives the tab 112 of the lever 82 when the lever is in position on the valve and the end edges 144, 146 act as stops limiting the travel of the lever 82. A resilient locking member 148 is provided on the back side of the flat plate 72''' and is fastened, e.g. by screws 154 to a corner of the plate adjacent the corner having the notch 140 therein. The resilient locking member 148 is generally rectangular in shape and includes a protruding tab 150 which extends into the path of the tab 112 of the lever beneath the annular opening of the flat plate 72'''. This tab 150 prevents the lever from being rotated from the off position all the way to the drain position by contacting the tab 112 of the lever when the lever is moved to the test position thereof. In order to rotate the lever to the drain position, it is necessary to push an exposed end 152 of the resilient locking member inwardly toward the valve housing 62 so that the locking member is moved out of reach of the tab 112. By this construction, it is possible to ensure that an accidental draining of the system does not occur. The tab 150 may be twisted along its length to present a ramp-like surface to the tab 112 of the lever when the lever is turned from the drain position, against surface 144, back toward the off position. In this manner, the tab 112 of the lever rides over the tab 150 so as to obviate the need for further pushing on the end 152.

Although not shown in any of the above-mentioned embodiments of the apparatus of the invention except for the embodiment of FIG. 28, a tap 136 may be provided in a side of the valve 42'''' opposite the inlet in order to permit the use of a pressure relief valve (not shown) in the apparatus. The use of a pressure relief valve in the valve arrangement ensures that the valve will not be subjected to dangerously high pressures which might damage the valve, the sight glasses, or other valve components in the arrangement. Such an arrangement provides a very versatile yet simple structure which can find application in many settings and environments.

While the preferred embodiments as described in the present application include a spherical shaped valve member, the present invention is readily adapted to other suitable, conventional valve configurations. For example, a plug valve (not shown) wherein the valve member comprises a truncated cone could be readily modified in accordance with the present invention by providing first, second and third ports in the valve member in the manner disclosed above.

Figure 34:
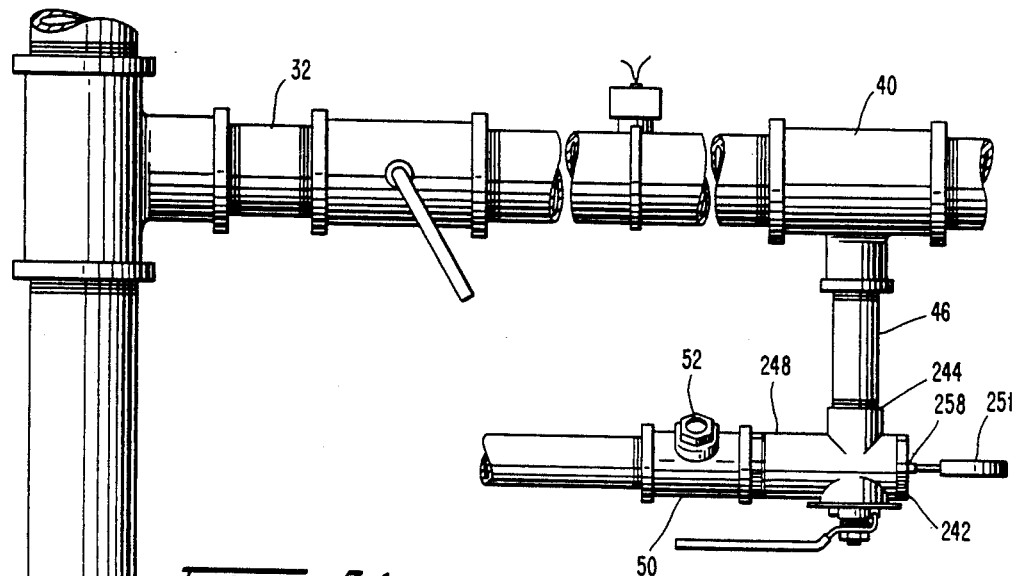
FIG. 34 is a front view of an arrangement for testing and draining a fire suppression water sprinkler system according to another embodiment of the present invention.

With reference now to FIG. 34, another arrangement for testing and draining a fire suppression water sprinkler system is disclosed wherein the valve 42 in the embodiment of FIG. 1 is replaced with a valve 242 according to the present invention. The structure and operation of the elements upstream and downstream of the valve 242 are identical to that described in connection with the embodiment of FIG. 1 and need not be repeated here.

In the embodiment of FIG. 34, the Tee fitting 40 provides communication between the branch conduit 32 and the valve 242. The valve 242 has an inlet 244 which is threaded onto the nipple 46 which is in turn threaded into the Tee fitting 40. Other arrangements for connecting the inlet of the valve to the branch conduit 32 will be readily obvious to one skilled in the art. An outlet 248 of the valve 242 is connected to the fitting 50 having a pair of sight glasses 52 threadably received at two couplings of the fitting which are separated from each other by an angle of about 90 degrees.

Figure 45:
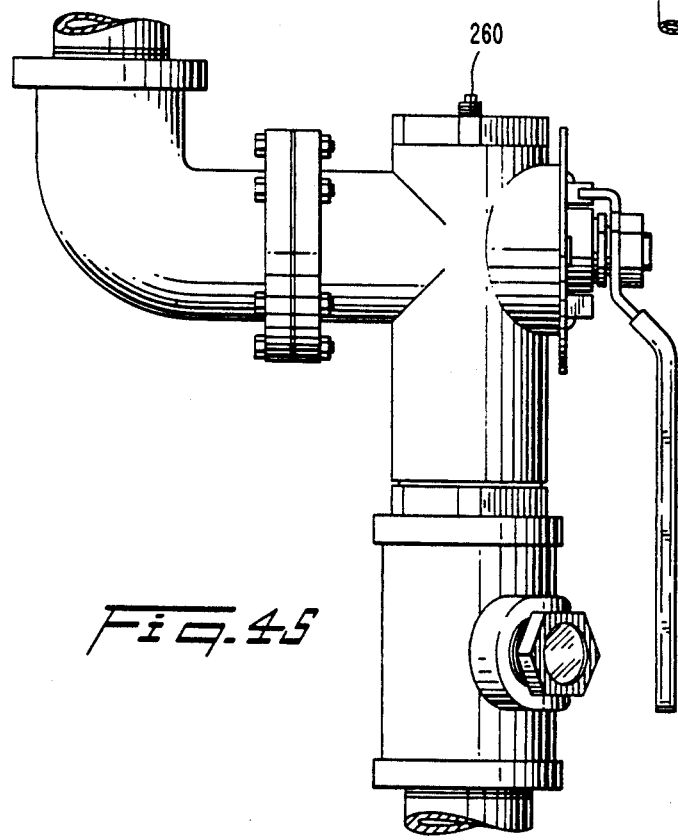
FIG. 45 is an enlarged view of the valve according to the embodiment of FIG. 44.

The valve 242 is provided with a pressure gauge 256 which senses the pressure in the valve 242 at the inlet of the valve. The pressure gauge 256 is threadably received by a pressure port 258. If the pressure gauge 256 is omitted, a plug 260 (see FIG. 45) may be threadably received by the pressure port 258.

Figure 35:
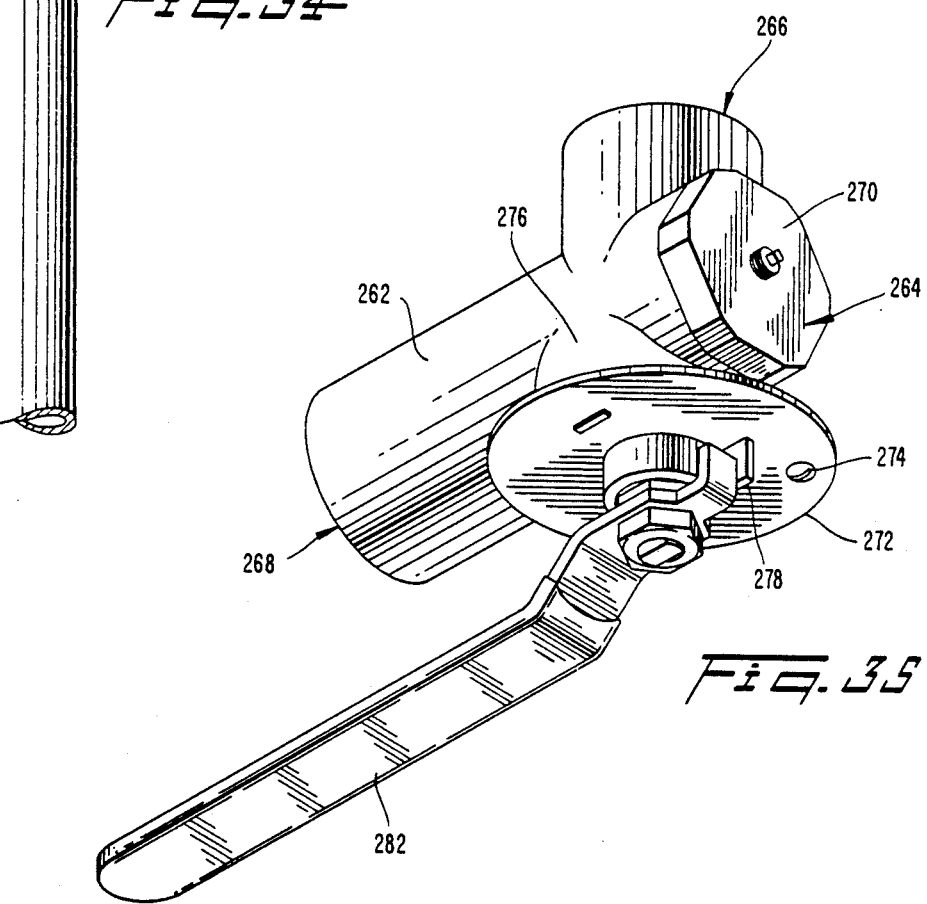
FIG. 35 is a pictorial view of the valve of FIG. 34.

With reference now to FIG. 35, the valve 242 according to the present invention includes a housing 262 having three threaded openings 264, 266 and 268 which are coplanar and spaced apart by 90 degrees. When in use as in the arrangement of FIG. 34, the second opening 266 is the inlet of the valve and the third opening 268 is the outlet. The first opening 264 (which is not used as an outlet in FIG. 34) is normally closed by a plug 270.

A stop plate 272 is mounted on the valve housing as by a pair of screws 274 which are threadably received by a mounting bracket 276 provided in the valve housing. The stop plate includes first and second shoulders 278, 280 which limit the movement of a control lever 282. The control lever is permitted by the stop plate to travel between "off", "test" and "drain" positions.

If desired, the housing could be configured with only two openings 266, 268 provided at right angles to one another. By providing three openings 264, 266, 268, however, the assembly of the valve is facilitated as more fully discussed below.

With reference now to FIG. 36, the valve 242 includes a ball member 284 which is received within an interior chamber of the housing 262 of the valve. In the valve 242 of FIG. 36, the housing is configured so as to receive the ball member 284 through the first opening 264. The ball member 284 is carried by a pair of annular seats 286, 286' which have an inner surface 288 that conforms to the spherical shape of the ball member 284. The annular seat 286' which is adjacent the plug 270 is preferably comprised of two annular seat elements 287 which, when placed together in an end-to-end manner as shown, form a substantially complete ring.

It is preferred that only about 2 to 4 degrees of gap space exist between the ends of the seat elements when they are in their proper positions in the valve 242 so that water is permitted to enter the seat cavity between the ends to pressurize the cavity. By this construction, the pressure port 258 in the plug 270 may be provided with the pressure gauge 256 as shown in FIG. 34 and get a reliable reading due to the ability of water pressure to reach the tap through the elements 287.

Alternatively, each annular seat 286' adjacent the plug 270 may be formed of a single seat element which includes a radially extending gap therein of about 2 to 4 degrees in width to permit the pressurization of the seat 286' in the valve 242.

The seats 286, 286' or seat elements 287, also have a peripheral surface 290 which is snugly urged into the interior chamber of the housing 262 by the ball member 284 when the assembly has been completed and which is forced against the interior chamber of the housing 262 by the pressure exerted on the seats 286, 286' by the ball member 284. In addition, the seats 286, 286' or seat elements 287 have an outer surface 292. The seat 286 which is positioned in the interior chamber of the housing ahead of the ball member abuts a shoulder (not shown) of the interior housing. The other seat 286' which is positioned in the interior chamber behind the ball member 284 may be retained in position by a seal (not shown).

The seal may be provided between the seat 286' and a threaded retainer (i.e. plug 270) which releasably maintains the ball member and associated seats within the interior chamber of the housing. The retainer and one or more of the threaded openings 264, 266, 268 are provided with a hexagonal peripheral surface so as to facilitate assembly and disassembly of the valve 242.

The ball member 284 is provided with a slot 298 which is adapted to receive a lowermost tab 300 of a stem 302. The stem is inserted into the valve housing 262 through a threaded opening 303 which is perpendicular to the openings 264 and 268 and collinear with the axis of the opening 266. The stem is provided with an annular bearing 304 and is sealed by a packing 306. A threaded retainer 308 maintains the stem in secure engagement with the slot of the ball member 284.

In a more preferred embodiment, the stem 302 is a "blow-out proof stem" which is inserted into the opening 303 through the first opening 264. The opening 303 is preferably configured so as to have an interior shoulder which receives a corresponding flange of the stem 302. In this way, in the event that the threaded retainer 308 should fail, the stem would not be propelled outwardly by reason of the water pressure acting on the stem.

The stop plate 272 is then mounted on the housing by way of the screws 274. The control lever 282 is then mounted on the stem 302 by a nut 310. The control lever 282 has a depending tab 312 which selectively abuts the stops 278, 280 of the stop plate 272 to limit movement of the control lever. In this way, movement of the ball member 284 is likewise limited to movement between the "off", "test" and "drain" positions.

In FIG. 37, the ball member 284 is provided with a first port 324 having a cross-sectional area corresponding to the opening provided by one of the individual sprinklers in the fire suppression water sprinkler system. The first port 324 communicates with second and third ports 326, 328 provided in the ball member 284. The second and third ports 326, 328 have a cross-sectional area which is relatively large in comparison with the first port 324 so that the second and third ports can quickly drain the water sprinkler system. Each of the first, second and third ports is perpendicular to the other two ports. In this way rotation of the ball member about an axis through the second port 326 can selectively bring the first and third ports into (and out of) communication with the outlet of the valve. In the present embodiment, the second port is always in communication with the inlet of the valve.

If desired, the ball member 284 may be provided with a slot (not shown) which is tapered along the surface of the ball member to present a shape which is non-symmetrical about the turning axis of the ball member 284. This slot 298 is matable with the lowermost tab 300 of the stem 302 so that the ball member and stem may only engage each other when the slot 298 and tab 300 are aligned. This construction ensures that the ball member ports are properly oriented with respect to the openings in the valve 242 as discussed above.

With reference now to FIG. 38, the valve 242 of FIG. 34 (with the sight glass housing not shown) has the control lever 282 in the "off" position. Since in the valve 242, the seats are provided adjacent the first and third openings 264, 268, the ball member is positioned by the control lever so that a solid portion of the spherical outer surface of the ball member is oriented toward the outlet of the valve. With reference to FIG. 41, the second port 326 is positioned adjacent the second opening 266 and the third port 328 is positioned adjacent the first opening 264 (closed by the plug). All of the ports are therefore positioned away from the third opening 268. Accordingly, water is not permitted to flow through the ball member from the inlet of the valve to the outlet.

With reference now to FIG. 39, the control lever has been rotated counterclockwise through 90 degrees to the "test" position. With reference to FIG. 42, a counterclockwise rotation of the ball member 284 through 90 degrees has presented the first port 324 adjacent the outlet of the valve. Water is therefore free to flow through the relatively large port 326 of the ball valve through the relatively small opening of the first port 324 and then through the outlet of the valve.

Figure 44:
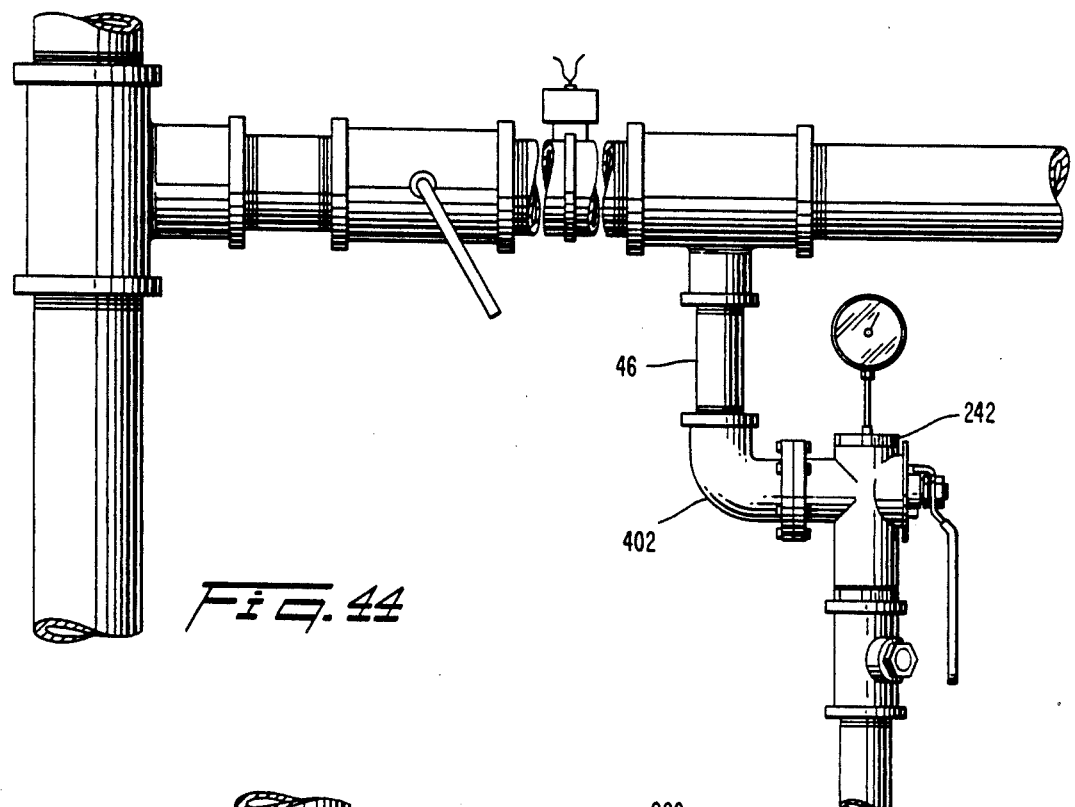
FIG. 44 is a front view of yet another arrangement for testing and draining a fire suppression water sprinkler system according to the present invention.

With reference now to FIG. 40, the control lever has been rotated counterclockwise through an additional 90 degrees to the "drain" position. With reference to FIG. 44, a counterclockwise rotation of the ball member 284 through an additional 90 degrees has presented the third port 328 adjacent the outlet of the valve. Water is then free to flow through the second and third ports from the inlet to the outlet of the valve.

The valve 242 of FIG. 34 is intended to ordinarily be located in or adjacent the ceiling of a building. Typically, the nipple 46 is oriented vertically and the valve 242 may be oriented as desired so that the outlet of the valve is directed in whatever direction is most convenient. Typically, in such installations, the direction of rotation of the actuating lever to operate the valve 242 will be unimportant. Therefore, although the valve 242 is shown in FIG. 35 to be oriented as a "left-handed" valve, it is to be understood that the designation of the valve 242 as a "left-handed" valve is for ease of description only.

Of course, the valve 242 may be made "reversible" if desired so that the direction of rotation of the actuating lever be clockwise rather than counterclockwise. As will be readily appreciated by one skilled in the art upon reading the present detailed description of the preferred embodiments, the operation of the actuating lever of the valve 242 may be "reversed" by providing the first port 324 on the opposite side of the ball valve member. Then with reference to FIGS. 39-44, the actuator would be rotated clockwise to change the valve from the off to test and then to drain conditions. Of course, suitable corresponding changes would be necessary to the stop plate in order to accommodate such a change in the operation of the valve 242.

Likewise, the outlet for the valve could be changed from the third opening 268 to the first opening 264, if desired. The orientations of the seats would then be reversed so that the solid seat would be adjacent the outlet for the valve.

Figure 46:
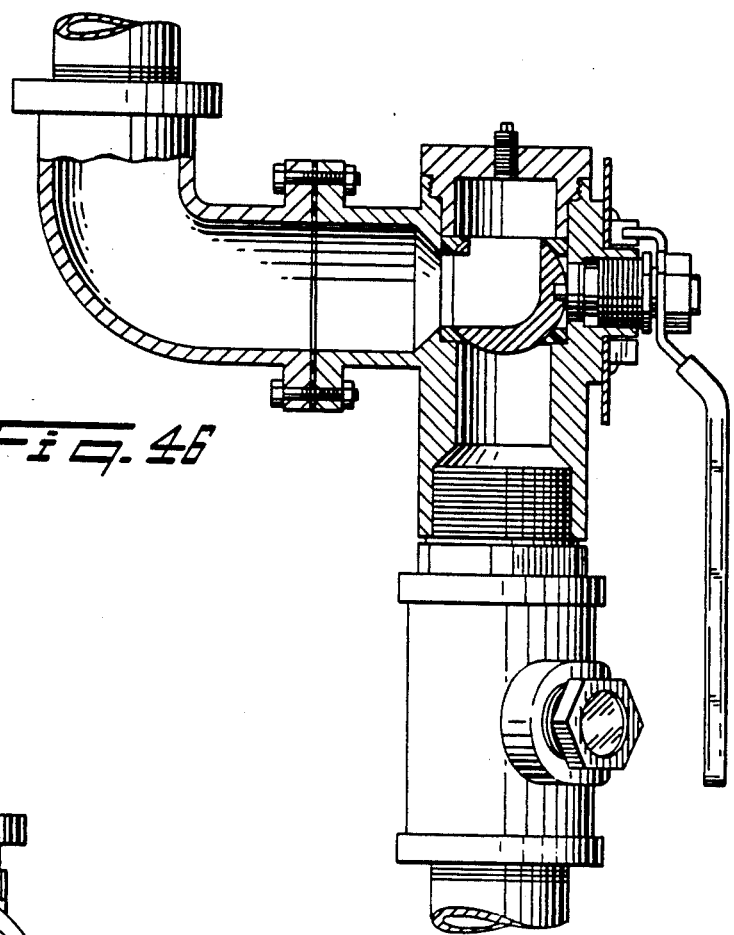
FIG. 46 is a side view in partial cross-section of the valve of FIG. 45.
Figure 47:
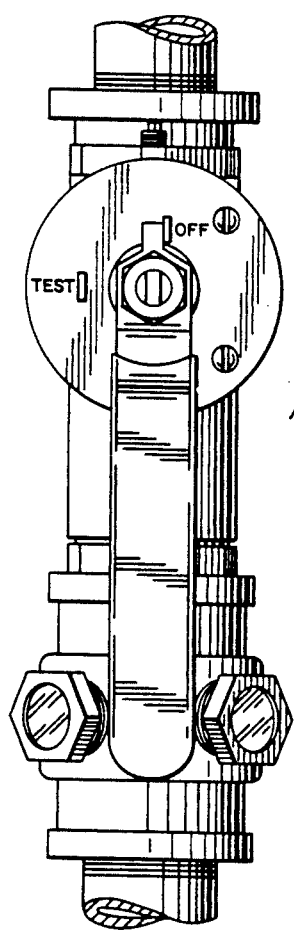
FIG. 47 is a front view of the valve of FIG. 46 with the lever in the off position.
Figure 48:
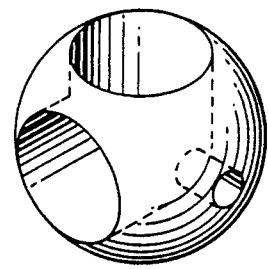
FIG. 48 is a pictorial view of the valve member of FIG. 46.

With reference now to FIG. 44, the valve 242 of FIG. 34 may be oriented vertically by providing an elbow 402 between the nipple 46 and the inlet of the valve 242. With reference to FIGS. 46-48, the construction and operation of the valve 242 when in the vertical orientation of FIG. 44 is substantially identical to that of the valve 242 when in the horizontal orientation of FIG. 35. However, as shown in FIG. 47, for example, it may be desirable to reorient the legends on the stop plate or to make other appropriate changes in the valve by reason of the vertical orientation.

With reference now to FIG. 49, the vertically oriented valve 242 of FIG. 44 (with the sight glass housing not shown) has the control lever 282 in the "off" position. Since in the valve 242, the seats are provided adjacent the first and third openings 264, 268, the ball member is positioned by the control lever so that a solid portion of the spherical outer surface of the ball member is oriented toward the outlet of the valve. With reference to FIG. 52, the second port 326 is positioned adjacent the second opening 266 and the third port 328 is positioned adjacent the first opening 264 (closed by the plug). All of the ports are therefore positioned away from the third opening 268. Accordingly, water is not permitted to flow through the ball member from the inlet of the valve to the outlet.

With reference now to FIG. 50, the control lever has been rotated counterclockwise through 90 degrees to the "test" position. With reference to FIG. 53, a counterclockwise rotation of the ball member 284 through 90 degrees has presented the first port 324 adjacent the outlet of the valve. Water is therefore free to flow through the relatively large port 328 of the ball valve through the relatively small opening of the first port 324 and then through the outlet of the valve.

With reference now to FIG. 51, the control lever has been rotated counterclockwise through an additional 90 degrees to the "drain" position. With reference to FIG. 54, a counterclockwise rotation of the ball member 284 through an additional 90 degrees has presented the third port 326 adjacent the outlet of the valve. Water is then free to flow through the second and third ports from the inlet to the outlet of the valve.

In operation, the arrangement according to the present invention is initially configured with the control lever in the "off" position so as to prevent a flow of water through the valve. The control lever is then rotated through 90 degrees so as to permit a flow of water at a preselected flow rate through the valve in order to test the system. If the flow of water causes the flow switch to be triggered, the test was successful and the control lever can be returned to the off position or when desired can be rotated further to the drain position to permit a flow of water at a second pre-selected flow rate.

While the valve and arrangement according to the present invention have been described with reference to a fire suppression water sprinkler system, it is expected that the valve and the arrangement may be of general utility in systems other than water sprinkler systems. Accordingly, the principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. An arrangement for testing and draining a fire suppression water sprinkler system, comprising:
   conduit means for supplying water to a plurality of sprinklers;
   means for sensing a flow of water in said conduit means;
   valve means provided downstream of said means for sensing and in communication with said conduit means, said valve means comprising
   a housing defining an interior chamber having an inlet and an outlet, said inlet and outlet being generally perpendicular to one another,
   a valve member provided within said interior chamber, the valve member having first, second and third ports arranged about a surface of the valve member, said valve member having a turning axis and said first, second and third ports including central axes which are generally perpendicular to one another, said first port having a size which is smaller than either of the second and third ports;
   seat means for selectively sealingly receiving a surface of the valve member adjacent the outlet; and
   means for selectively moving said valve member within said interior chamber whereby communication between said inlet and outlet may be sequentially closed, opened to a first preselected flow rate and then opened to a second preselected flow rate, said second preselected flow rate being greater than the first preselected flow rate.

2. The arrangement of claim 1, wherein the valve member is generally spherical.

3. The arrangement of claim 2, wherein said second port is always in communication with said inlet and wherein said means for selectively moving said valve member is adapted to sequentially and selectively rotate said valve member to position said third port adjacent said outlet to permit communication between said inlet and said outlet at said second preselected flow rate, then to position said first port adjacent the outlet to permit communication between the inlet and outlet at said first preselected flow rate and then to selectively position said first and third ports away from said outlet to interrupt communication between said inlet and said outlet.

4. The arrangement of claim 3 further comprising means for permitting a pressure within said housing to be sensed.

5. The arrangement of claim 3, wherein said housing includes an opening which is coplanar with said inlet and said outlet and perpendicular to said inlet, said opening being threadably closed by a plug member whereby the valve member may be readily assembled in said valve housing.

6. The arrangement of claim 1, wherein said communication between said inlet and said outlet is closed by selectively moving said valve member to position said first and third ports away from said outlet, said communication between said inlet and outlet being opened to said first preselected flow rate by selectively moving said valve member to position said first port adjacent said outlet, said communication between said inlet and outlet being opened to said second preselected flow rate by selectively moving said valve member to position said third port adjacent the outlet.

7. The arrangement of claim 1, wherein the seat means is comprised of at least one annular member having a radial gap with a width extending in the circumferential direction of the seat means.

8. The arrangement of claim 7, wherein the width of the gap is between 2 and 4 degrees of the circumference of the annular member.

9. A valve, comprising:
   a housing defining an interior chamber having an inlet and an outlet, said inlet being generally perpendicular to said outlet;
   a valve member provided within said interior chamber, the valve member having first, second and third ports arranged about a surface of the valve member, said valve member having a turning axis and said first, second and third ports including central axes which are generally perpendicular to one another, said first port having a size which is smaller than either of the second and third ports;
   seat means for selectively sealingly receiving a surface of the valve member adjacent the outlet; and means for selectively moving said valve member within said interior chamber whereby communication between said inlet and outlet may be sequentially closed, opened to a first preselected flow rate and then opened to a second preselected flow rate, said second preselected flow rate being greater than the first preselected flow rate.

10. The valve of claim 9, wherein the valve member is generally spherical.

11. The valve of claim 9, wherein said second port is always in communication with said inlet and wherein said means for selectively moving said valve member is adapted to sequentially and selectively rotate said valve member to position said third port adjacent said outlet to permit communication between said inlet and said outlet at said second preselected flow rate, then to position said first port adjacent the outlet to permit communication between the inlet and outlet at said first preselected flow rate and then to selectively position said first and third ports away from said outlet to interrupt communication between said inlet and said outlet.

12. The valve of claim 11 further comprising means for permitting a pressure within said housing to be sensed.

13. The valve of claim 9, wherein said housing includes an opening which is coplanar with said inlet and said outlet and perpendicular to said inlet, said opening being threadably closed by a plug member whereby the valve member may be readily assembled in said valve housing.

14. The valve of claim 9, wherein said communication between said inlet and said outlet is closed by selectively moving said valve member to position said first and third ports away from said outlet, said communication between said inlet and outlet being opened to said first preselected flow rate by selectively moving said valve member to position said first port adjacent said outlet, said communication between said inlet and outlet being opened to said second preselected flow rate by selectively moving said valve member to position said third port adjacent the outlet.

15. The valve of claim 9, wherein the seat means is comprised of at least one annular member having a radial gap with a width extending in the circumferential direction of the seat means.

16. The valve of claim 15, wherein the width of the gap is between 2 and 4 degrees of the circumference of the annular member.

17. An arrangement for testing and draining a fire suppression water sprinkler system, comprising:
conduit means for supplying water to a plurality of sprinklers;
means for sensing a flow of water in said conduit means;
valve means provided downstream of said means for sensing and in communication with said conduit means, said valve means comprising
a housing defining an interior chamber having an inlet and an outlet, said inlet and outlet being generally perpendicular to one another,
a valve member provided within said interior chamber, the valve member having first, second, and third ports arranged about a surface of the valve member, said valve member having a turning axis and said first and second ports having central axes which are generally perpendicular to one another, and said second and third ports having central axes which are generally perpendicular to one another, said first port having a size which is smaller than either of the second and third ports;
seat means for selectively sealingly receiving a surface of the valve member adjacent the outlet; and
means for selectively moving said valve member within said interior chamber whereby communication between said inlet and outlet may be selectively opened to a first preselected flow rate, closed, and opened to a second preselected flow rate, said second preselected flow rate being greater than the first preselected flow rate.

18. The arrangement of claim 17, wherein the valve member is generally spherical.

19. The arrangement of claim 18, wherein said means for selectively moving said valve member is adapted to selectively rotate said valve member to position one of said second and third ports adjacent said outlet to permit communication between said inlet and said outlet at said second preselected flow rate, to position said first port adjacent the outlet to permit communication between the inlet and outlet at said first preselected flow rate, and to position said first, second and third ports away from said outlet to interrupt communication between said inlet and said outlet.

20. The arrangement of claim 19 further comprising means for permitting a pressure within said housing to be sensed.

21. The arrangement of claim 19, wherein said housing includes an opening which is coplanar with said inlet and said outlet and perpendicular to said inlet, said opening being threadably closed by a plug member.

22. The arrangement of claim 17, wherein said communication between said inlet and said outlet is closed by selectively moving said valve member to position said first and third ports away from said outlet, said communication between said inlet and outlet being opened to said first preselected flow rate by selectively moving said valve member to position said first port adjacent said outlet, said communication between said inlet and outlet being opened to said second preselected flow rate by selectively moving said valve member to position said third port adjacent the outlet.

23. The arrangement of claim 17, wherein the seat means is comprised of at least one annular member having a radial gap with a width extending in the circumferential direction of the seat means.

24. The arrangement of claim 23, wherein the width of the gap is between 2 and 4 degrees of the circumference of the annular member.

25. The arrangement of claim 17, wherein said housing includes an integral sight glass.

26. The arrangement of claim 17, further comprising sight glass means for permitting a visual observation of a flow through said housing.

27. The arrangement of claim 26, wherein said sight glass means includes a first sight glass member and a second sight glass member each extending along a sight axis, the sight axis of the first sight glass member being offset from the sight axis of the second sight glass member by substantially 90 degrees.

28. The arrangement of claim 22, further comprising a first sight glass member and a second sight glass member each extending along a sight axis, the sight axis of the first sight glass member being offset from the sight axis of the second sight glass member by substantially 90 degrees.

29. The arrangement of claim 26, said sight glass means including a first sight glass member and a second sight glass member each extending along a sight axis, the sight axis of the first sight glass member extending in a direction perpendicular to the horizontal direction and offset from the vertical by 45 degrees and the sight axis of the second sight glass member extending in a direction perpendicular to the horizontal direction and offset from the vertical by 45 degrees in a direction opposite of the offset of the first sight axis.

30. The arrangement of claim 17, further comprising locking means for preventing said valve means from being opened to said second preselected flow rate when said locking means is locked.

31. The arrangement of claim 18, wherein said second port is always in communication with said inlet and wherein said means for selectively moving said valve member is adapted to selectively rotate said valve member to position said third port adjacent said outlet to permit communication between said inlet and said outlet at said second preselected flow rate, to position said first port adjacent the outlet to permit communication between the inlet and the outlet at said first preselected flow rate, and to position said first and third ports away from said outlet to interrupt communication between said inlet and said outlet.

32. The arrangement of claim 31, wherein said housing includes an integral sight glass.

33. The arrangement of claim 31, further comprising sight glass means for permitting a visual observation of a flow through said housing.

34. The arrangement of claim 33, wherein said sight glass means includes a first sight glass member and a second sight glass member each extending along a sight axis, the sight axis of the first sight glass member being offset from the sight axis of the second sight glass member by substantially 90 degrees.

35. The arrangement of claim 31, further comprising a first sight glass member and a second sight glass member each extending along a sight axis, the sight axis of the first sight glass member being offset from the sight axis of the second sight glass member by substantially 90 degrees.

36. A valve, comprising:
a housing defining an interior chamber having an inlet and an outlet, said inlet being generally perpendicular to said outlet;
a valve member provided within said interior chamber, the valve member having first and second, and third ports arranged about a surface of the valve member, said valve member having a turning axis and said first and second ports having central axes which are generally perpendicular to one another, and said second and third ports having central axes which are generally perpendicular to one another, said first port having a size which is smaller than either of the second and third ports;
seat means for selectively sealingly receiving a surface of the valve member adjacent the outlet; and
means for selectively moving said valve member within said interior chamber whereby communication between said inlet and outlet may be selectively opened to a first preselected flow rate, closed, and opened to a second preselected flow rate, said second preselected flow rate being greater than the first preselected flow rate.

37. The valve of claim 36, wherein the valve member is generally spherical.

38. The valve of claim 37, wherein said means for selectively moving said valve member is adapted to selectively rotate said valve member to position one of said second and third ports adjacent said outlet to permit communication between said inlet and said outlet at said second preselected flow rate, to position said first port adjacent the outlet to permit communication between the inlet and outlet at said first preselected flow rate, and to position said first, second and third ports away from said outlet to interrupt communication between said inlet and said outlet.

39. The valve of claim 38 further comprising means for permitting a pressure within said housing to be sensed.

40. The valve of claim 38, wherein said housing includes an opening which is coplanar with said inlet and said outlet and perpendicular to said inlet, said opening being threadably closed by a plug member.

41. The valve of claim 36, wherein said communication between said inlet and said outlet is closed by selectively moving said valve member to position said first and third ports away from said outlet, said communication between said inlet and outlet being opened to said first preselected flow rate by selectively moving said valve member to position said first port adjacent said outlet, said communication between said inlet and outlet being opened to said second preselected flow rate by selectively moving said valve member to position said third port adjacent the outlet.

42. The valve of claim 36, wherein the seat means is comprised of at least one annular member having a radial gap with a width extending in the circumferential direction of the seat means.

43. The valve of claim 42, wherein the width of the gap is between 2 and 4 degrees of the circumference of the annular member.

44. The valve of claim 36, wherein said housing includes an integral sight glass.

45. The valve of claim 36, further comprising sight glass means for permitting a visual observation of a flow through said housing.

46. The valve of claim 46, wherein said sight glass means includes a first sight glass member and a second sight glass member each extending along a sight axis, the sight axis of the first sight glass member being offset from the sight axis of the second sight glass member by substantially 90 degrees.

47. The valve of claim 40, further comprising a first sight glass member and a second sight glass member each extending along a sight axis, the sight axis of the first sight glass member being offset from the sight axis of the second sight glass member by substantially 90 degrees.

48. The valve of claim 45, said sight glass means including a first sight glass member and a second sight glass member each extending along a sight axis, the sight axis of the first sight glass member extending in a direction perpendicular to the horizontal direction and offset from the vertical by 45 degrees and the sight axis of the second sight glass member extending in a direction perpendicular to the horizontal direction and offset from the vertical by 45 degrees in a direction opposite of the offset of the first sight axis.

49. The valve of claim 36, further comprising locking means for preventing said valve means from being opened to said second preselected flow rate when said locking means is locked.

50. The valve of claim 37, wherein said second port is always in communication with said inlet and wherein said means for selectively moving said valve member is adapted to selectively rotate said valve member to position said third port adjacent said outlet to permit communication between said inlet and said outlet at said second preselected flow rate, to position said first port adjacent the outlet to permit communication between the inlet and the outlet at said first preselected flow rate, and to position said first and third ports away from said outlet to interrupt communication between said inlet and said outlet.

51. The valve of claim 50, wherein said housing includes an integral sight glass.

52. The valve of claim 50, further comprising sight glass means for permitting a visual observation of a flow through said housing.

53. The arrangement of claim 52, wherein said sight glass means includes a first sight glass member and a second sight glass member each extending along a sight axis, the sight axis of the first sight glass member being offset from the sight axis of the second sight glass member by substantially 90 degrees.

54. The arrangement of claim 50, further comprising a first sight glass member and a second sight glass member each extending along a sight axis, the sight axis of the first sight glass member being offset from the sight axis of the second sight glass member by substantially 90 degrees.

* * * * *